(12) United States Patent
Ikuma et al.

(10) Patent No.: US 12,587,757 B2

(45) Date of Patent: Mar. 24, 2026

(54) SOLID-STATE IMAGING DEVICE

(71) Applicant: Nuvoton Technology Corporation Japan, Kyoto (JP)

(72) Inventors: Makoto Ikuma, Hyogo (JP); Yutaka Abe, Osaka (JP); Takayasu Kito, Osaka (JP); Norihiko Sumitani, Osaka (JP); Kenji Watanabe, Kyoto (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 63 days.

(21) Appl. No.: 18/889,974

(22) Filed: Sep. 19, 2024

(65) Prior Publication Data

US 2025/0016467 A1 Jan. 9, 2025

Related U.S. Application Data

(63) Continuation of application No. PCT/JP2023/010473, filed on Mar. 16, 2023.

(30) Foreign Application Priority Data

Mar. 25, 2022 (JP) ................................. 2022-050669

(51) Int. Cl.
H04N 25/59 (2023.01)
H04N 25/42 (2023.01)
(Continued)

(52) U.S. Cl.
CPC ............. H04N 25/59 (2023.01); H04N 25/42 (2023.01); H04N 25/771 (2023.01); H04N 25/772 (2023.01); H04N 25/778 (2023.01)

(58) Field of Classification Search
CPC ...... H04N 25/59; H04N 25/42; H04N 25/771; H04N 25/772; H04N 25/778; H04N 25/78; H04N 25/57; H04N 25/70; H10F 39/12

See application file for complete search history.

(56) References Cited

U.S. PATENT DOCUMENTS

2004/0179748 A1* 9/2004 McDermott ......... H04N 25/621
348/E3.018
2008/0001065 A1* 1/2008 Ackland ................ H04N 25/78
348/E3.019
(Continued)

FOREIGN PATENT DOCUMENTS

JP 3878613 B2 2/2007
JP 4497366 B2 7/2010

OTHER PUBLICATIONS

International Search Report (ISR) issued on May 30, 2023 in International Application No. PCT/JP2023/010473, 9 pages.

*Primary Examiner* — Abdelaaziz Tissire

(74) *Attorney, Agent, or Firm* — Rimon P.C.

(57) ABSTRACT

A solid-state imaging device includes a pixel circuit that outputs a plurality of pixel signals, a detection circuit, and a signal processor. The pixel circuit includes a photodiode, a transfer transistor that reads out a signal of the photodiode to a charge storage, and a storage capacitance that stores a charge overflowing from the photodiode. The detection circuit compares a signal of the storage capacitance with a reference signal and, when the signal of the storage capacitance has reached the reference signal, initializes the photodiode and the storage capacitance and counts an initialization count. The signal processor calculates a first signal that indicates intensity of incident light, in accordance with the initialization count and a mixed signal of the signal of the storage capacitance and the signal of the photodiode that has been read out to the charge storage by the transfer transistor.

20 Claims, 25 Drawing Sheets

(51) Int. Cl.
    *H04N 25/771*       (2023.01)
    *H04N 25/772*       (2023.01)
    *H04N 25/778*       (2023.01)

(56)           References Cited

U.S. PATENT DOCUMENTS

2009/0244346 A1* 10/2009 Funaki ................. H04N 25/772
                                        348/308
2010/0026838 A1* 2/2010 Belenky ................. H04N 25/58
                                   348/E5.037
2012/0059625 A1* 3/2012 Kim ...................... G01S 7/4863
                                   702/159
2014/0028883 A1* 1/2014 Shin ...................... G01S 17/894
                                   348/297
2015/0268094 A1* 9/2015 Mellot ...................... G01J 1/42
                                 250/214 AL
2020/0322555 A1* 10/2020 Ogawa ................. H04N 25/583
2021/0320140 A1* 10/2021 Kitano ............... H10F 39/8023
2024/0040283 A1* 2/2024 Suess .................. H04N 25/709

* cited by examiner

| B | Gb | B | Gb | B | Gb | B | Gb |
|---|----|---|----|---|----|---|----|
| Gr | R | Gr | R | Gr | R | Gr | R |

| B | Gb | B | Gb | B | Gb | B | Gb |
|---|----|---|----|---|----|---|----|
| Gr | R | Gr | R | Gr | R | Gr | R |

SOLID-STATE IMAGING DEVICE

CROSS REFERENCE TO RELATED APPLICATIONS

This is a continuation application of PCT International Application No. PCT/JP2023/010473 filed on Mar. 16, 2023, designating the United States of America, which is based on and claims priority of Japanese Patent Application No. 2022-050669 filed on Mar. 25, 2022. The entire disclosures of the above-identified applications, including the specifications, drawings and claims are incorporated herein by reference in their entirety.

FIELD

The present disclosure relates to a solid-state imaging device.

BACKGROUND

Patent Literatures (PTLs) 1 and 2 disclose methods for wide dynamic range (WDR) imaging in a solid-state imaging device.

CITATION LIST

Patent Literature

PTL 1: Japanese Patent No. 3878613
PTL 2: Japanese Patent No. 4497366

SUMMARY

Technical Problem

The solid-state imaging device disclosed in PTL 1 discloses a pulse-width modulation (PWM) method as a method of detecting light intensities of photodiode signals. The PWM method is a method of detecting the intensity of incident light as the widths of pulse signals or the frequencies of occurrence of pulse signals. At this time, since the PWM method is available only on photodiode signals, there is a problem that it is difficult to expand the dynamic range. There is also a problem that in the absence of a transfer transistor, reset components cannot be read out, i.e., correlated double sampling (CDS) for removing reset components cannot be performed, after every initialization and accordingly low-illumination noise increases. Yet another problem is that the S/N ratio of the photodiode remains unchanged even if digitally multiplied by N and is thus difficult to improve.

The solid-state imaging device disclosed in PTL 2 discloses a method of storing signals that have exceeded a predetermined threshold value and overflowed from a photodiode in a storage capacitance via an overflow element. There is, however, a problem that further expansion of the dynamic range is difficult because the storage capacitance is determined to and kept at a fixed value under process constraints.

In view of this, the present disclosure provides a solid-state imaging device capable of easily expanding the dynamic range.

Solution to Problem

A solid-state imaging device according to the present disclosure includes a pixel circuit that outputs a plurality of pixel signals, a detection circuit, a pixel control circuit that controls the pixel circuit, and a signal processor. The pixel circuit includes a photodiode, a first transfer transistor that reads out a signal of the photodiode to a floating diffusion, and a storage capacitance that stores a charge overflowing from the photodiode. The detection circuit compares a signal of the storage capacitance with a first reference value and, when the signal of the storage capacitance has reached the first reference value, initializes the photodiode and the storage capacitance via the pixel control circuit and counts an initialization count. The signal processor calculates a first signal that indicates intensity of incident light in accordance with the initialization count and a mixed signal of the signal of the storage capacitance and the signal of the photodiode that has been read out to the floating diffusion by the first transfer transistor.

It is to be noted that such a generic or specific aspect of the present disclosure may be embodied as a system, a method, an integrated circuit, a computer program, or a recording medium such as a computer-readable CD-ROM, or may be embodied as any combination of a system, a method, an integrated circuit, a computer program, and a recording medium.

Advantageous Effects

The solid-state imaging device according to one aspect of the present disclosure is capable of easily expanding the dynamic range.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 1 is a block diagram showing an exemplary configuration of a solid-state imaging device according to an embodiment.

FIG. 2C is a block diagram showing the exemplary configurations of the pixel circuit and the logic circuit according to the embodiment.

FIG. 3 is a block diagram showing other exemplary configurations of the pixel circuit and the logic circuit according to the embodiment.

FIG. 12 is a diagram showing an example of timing serving as the basis of a PWM method.

FIG. 13 is a diagram showing an example of timing when an AD conversion circuit is used in the PWM method.

DESCRIPTION OF EMBODIMENT

Figure 2A:
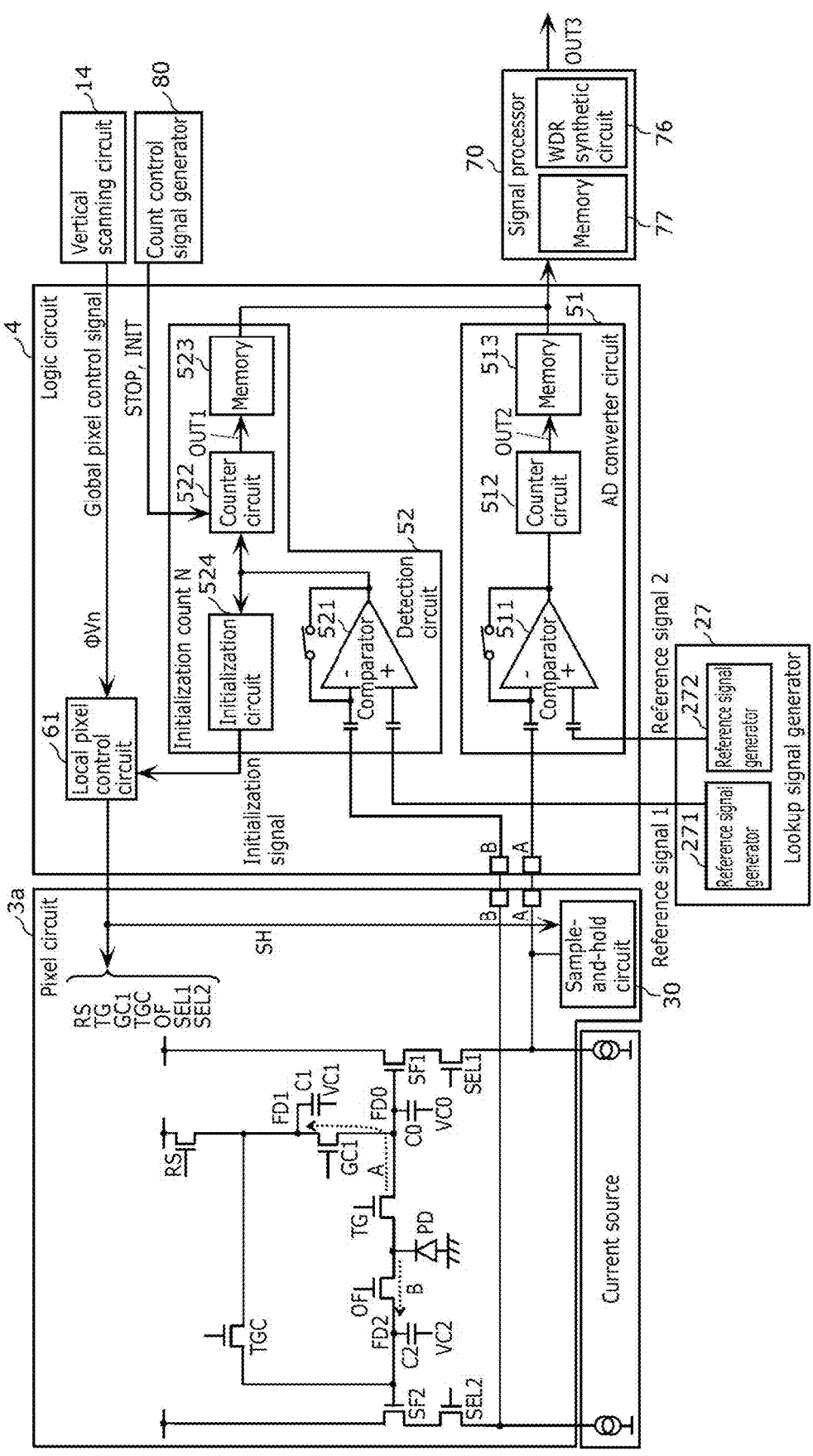
FIG. 2A is a block diagram showing exemplary configurations of a pixel circuit and a logic circuit according to the embodiment.

A solid-state imaging device according to one aspect of the present disclosure includes a pixel circuit that outputs a plurality of pixel signals, a detection circuit, a pixel control circuit that controls the pixel circuit, and a signal processor. The pixel circuit includes a photodiode, a first transfer transistor that reads out a signal of the photodiode to a floating diffusion, and a storage capacitance that stores a charge overflowing from the photodiode. The detection circuit compares a signal of the storage capacitance with a first reference value and, when the signal of the storage capacitance has reached the first reference value, initializes the photodiode and the storage capacitance via the pixel control circuit and counts an initialization count. The signal processor calculates a first signal that indicates intensity of incident light in accordance with the initialization count and a mixed signal of the signal of the storage capacitance and the signal of the photodiode that has been read out to the floating diffusion by the first transfer transistor.

When high-intensity (high-illumination) incident light is incident, a charge overflows from the photodiode and is stored in the storage capacitance. However, in some cases, the incident light may have such a high intensity that is even beyond the capacity of the storage capacitance. Even in such a case, when the signal of the storage capacitance has reached the first reference value, the photodiode and the storage capacitance are initialized to allow continuous charge storage. At this time, the number of times initialization is executed (initialization count) is counted so that it is possible to know the amounts of charges cleared in the photodiode and the storage capacitance by initialization. Then, the intensity of the incident light, even if it is high, can be calculated by using a mixed signal of the signal of the photodiode and the signal of the storage capacitance that are obtained when the signal of the storage capacitance can no more reach the first reference value, and the initialization count, i.e., the amounts of charges cleared from the photodiode and the storage capacitance by a single or multiple executions of initialization since the incidence of the incident light. Accordingly, it is possible to easily expand the dynamic range. For example, the dynamic range can be expanded more than in the case where the PWM method is not used.

For example, the solid-state imaging device may further include a sample-and-hold circuit, and an analog-to-digital (AD) conversion circuit.

For example, at least one pixel signal among the plurality of pixel signals may be not retained in the sample-and-hold circuit and may be directly AD-converted by the AD conversion circuit. At least one other pixel signal among the plurality of pixel signals may be retained in the sample-and-hold circuit, and the signal retained may be AD-converted by the AD conversion circuit.

By causing the AD conversion circuit to directly AD-convert some of the pixel signals, it is possible to reduce low-illumination noise. For example, the presence of the sample-and-hold circuit for each pixel circuit eliminates the need to provide memory for each pixel signal. This is effective for a minute cell that has area constraints.

For example, when the initialization count is one or more, the pixel circuit may output a second signal and initialize the photodiode and the storage capacitance during exposure, the second signal being a mixed signal of the signal of the photodiode and the signal of the storage capacitance that are obtained when the signal of the storage capacitance has reached the first reference value, the second signal may be retained in the sample-and-hold circuit, and the signal retained may be AD-converted by the AD conversion circuit, and the pixel circuit may output a third signal at an end of the exposure, the third signal being a mixed signal of the signal of the photodiode and the signal of the storage capacitance that are remaining in the photodiode and the storage capacitance due to the signal of the storage capacitance not reaching the first reference value. The third signal may be not retained in the sample-and-hold circuit and may be directly AD-converted by the AD conversion circuit.

By causing the sample-and-hold circuit to retain the second signal, which is a mixed signal of the signal of the photodiode and the signal of the storage capacitance that are obtained when the signal of the storage capacitance has reached the first reference value, it is possible to retain the amount of charge available per initialization. Note that the third signal, which is the mixed signal of the signal of the photodiode and the signal of the storage capacitance that are remaining in the photodiode and the storage capacitance due to the signal of the storage capacitance not reaching the first reference value at the end of exposure, is directly AD-converted by the AD conversion circuit because the sample-and-hold circuit has already retained the second signal.

For example, the signal processor may calculate the first signal by computing a sum of the third signal and a product of the second signal and the initialization count.

In this way, the first signal can be calculated from the following expression: second signal×initialization count+third signal.

For example, the sample-and-hold circuit may include a first sample-and-hold capacitance element for a reset component, and a second sample-and-hold capacitance element for a signal component. When the initialization count is one or more, during exposure, a reset component may be retained in the first sample-and-hold capacitance element after initialization of the photodiode and the storage capacitance, when the signal of the storage capacitance has reached the first reference value during exposure, the second signal may be retained as a signal component in the second sample-and-hold capacitance element, and the AD conversion circuit may perform AD conversion of a pixel signal level by comparing the pixel signal level with a second reference value, the pixel signal level being obtained by deducting the reset component from the signal component.

In this way, correlated double sampling (CDS) allows accurate readout of the second signal.

For example, when the initialization count is zero, the pixel circuit may output a fourth signal in a low illumination mode for low illumination and output a fifth signal in a mode for high illumination higher than illumination in the low illumination mode, the fourth signal may be not retained in the sample-and-hold circuit and may be directly AD-converted by the AD conversion circuit, and the fifth signal may be retained in the sample-and-hold circuit, and the signal retained may be AD-converted by the AD conversion circuit.

The direct AD conversion of the fourth signal that has been output in the low illumination mode reduces low-illumination noise. Although the fifth signal that has been output in the mode for high illumination higher than illumination in the low illumination mode is retained in the sample-and-hold circuit and therefore kTC noise is produced during sampling, this influence can be reduced by the WDR synthesis of the fifth signal and the fourth signal. Accordingly, it is possible to achieve WDR at an excellent S/N ratio under low illumination conditions.

For example, the pixel circuit may further include a second transfer transistor that transfers a charge stored in the storage capacitance to the floating diffusion, a first amplifier transistor that outputs the signal of the photodiode and the signal of the storage capacitance, a first selector transistor connected to the first amplifier transistor, a second amplifier transistor connected to the storage capacitance, and a second selector transistor connected to the second amplifier transistor. The detection circuit may be connected to the storage capacitance via the second selector transistor and the second amplifier transistor. In the low illumination mode, the pixel circuit may output the signal of the photodiode as the fourth signal from the first amplifier transistor via the first transfer transistor. The mode for high illumination may include a high illumination mode in which the pixel circuit outputs the signal of the storage capacitance as a sixth signal from the first amplifier transistor via the second transfer transistor. The sixth signal may belong to the fifth signal.

In this way, in the low illumination mode, the fourth signal for low illumination is output from the first amplifier transistor via the first transfer transistor, whereas in the high illumination mode, the sixth signal for high illumination is output from the first amplifier transistor via the second transfer transistor. Besides, the signal of the storage capacitance can be detected via the second amplifier transistor. Therefore, it is possible to determine whether the signal of the storage capacitance has reached the first reference value, or in other words, it is possible to count the initialization count. This, for example, reduces the possibility that LED flicker may be overlooked.

For example, the pixel circuit may further include a reset transistor. The detection circuit may discharge charges stored in the photodiode and the storage capacitance and initialize the photodiode and the storage capacitance by controlling the reset transistor, the first transfer transistor, and the second transfer transistor via the pixel control circuit in accordance with a result of the comparison between the signal of the storage capacitance and the first reference value.

Since the reset transistor, the first transfer transistor, and the second transfer transistor are reset under the control of the pixel control circuit, it is possible to more reliably discharge and initialize the charges stored in the photodiode and the storage capacitance.

For example, the pixel circuit may further include a gain switching transistor that switches a gain of the signal of the photodiode. The mode for high illumination may include a middle illumination mode in which the pixel circuit outputs the signal of the photodiode as a seventh signal from the first amplifier transistor by controlling the gain switching transistor. The seventh signal may belong to the fifth signal.

In the middle illumination mode, the gain switching transistor is controlled to output the seventh signal for middle illumination from the first amplifier transistor. This, for example, reduces a difference in S/N ratio at boundaries (transition regions) of the sixth signal for high illumination, the seventh signal for middle illumination, and the fourth signal for low illumination.

For example, when the initialization count is one or more, the pixel circuit may output a second signal and initialize the photodiode and the storage capacitance during exposure, the second signal being a mixed signal of the signal of the photodiode and the signal of the storage capacitance that are obtained when the signal of the storage capacitance has reached the first reference value, the second signal may be retained in the sample-and-hold circuit, and the signal retained may be AD-converted by the AD conversion circuit, the pixel circuit may output a third signal at an end of the exposure, the third signal being a mixed signal of the signal of the photodiode and the signal of the storage capacitance that are remaining in the photodiode and the storage capacitance due to the signal of the storage capacitance not reaching the first reference value, and the third signal may be not retained in the sample-and-hold circuit and may be directly AD-converted by the AD conversion circuit. The sample-and-hold circuit may include a first sample-and-hold capacitance element for a reset component, and a second sample-and-hold capacitance element for a signal component. When the initialization count is one or more, during exposure, a reset component may be retained in the first sample-and-hold capacitance element after initialization of the photodiode and the storage capacitance, when the signal of the storage capacitance has reached the first reference value during exposure, the second signal may be retained as a signal component in the second sample-and-hold capacitance element, the AD conversion circuit may perform AD conversion of a pixel signal level by comparing the pixel signal level with a second reference value, the pixel signal level being obtained by deducting the reset component from the signal component, and the second reference value may correspond to a saturation level of the fourth signal.

By using the saturation level of the fourth signal for low illumination as the second reference signal, it is possible to determine whether the intensity of the incident light is at a low illumination level. Then, a signal can be selected from among a plurality of pixel signals (e.g., the fourth signal, the sixth signal, and the seventh signal) in accordance with the determination result. This allows the solid-state imaging device to achieve a reduction in area, a speedup, and a reduction in power consumption.

For example, the signal processor may include a WDR processor. When the initialization count is one or more, the WDR processor may generate an output signal from at least the first signal. When the initialization count is zero, the WDR processor may generate an output signal from at least one of the fourth signal or the fifth signal.

In this way, when the initialization count is one or more, i.e., when the incident light has high illumination, the output signal is generated from the first signal, whereas when the initialization count is zero, i.e., when the incident light has middle illumination or low illumination, the output signal is generated from the fourth signal or the fifth signal (e.g., the sixth signal or the seventh signal). This allows the dynamic range to expand from low illumination to high illumination.

For example, the AD conversion circuit may include a comparator. When the initialization count is zero, the pixel circuit may output three or more pixel signals, the comparator may compare one pixel signal that has been AD-converted among the three or more pixel signals with a second reference value and, when the one pixel signal has reached the second reference value, generate a selection signal that instructs to select at least two pixel signals from among the three or more pixel signals, and the pixel control circuit may select the at least two pixel signals from among the three or more pixel signals in accordance with the selection signal.

By selecting at least two pixel signals from among the three or more pixel signals output from the pixel circuit, the solid-state imaging device is capable of achieving a reduction in area, a speedup, and a reduction in power consumption. In the case where the counter circuit of the AD conversion circuit adopts a binary counter system, it is possible to select at least two pixel signals because digital signals are proportional to the levels of pixel signals. However, in the case where the counter circuit of the AD conversion circuit adopts a gray-code counter system, it is not possible to select at least two pixel signals because digital signals are not proportional to the levels of pixel signals. Thus, this feature is particularly effective for cases where a gray-code counter system is adopted in order to achieve a reduction in power consumption.

For example, the AD conversion circuit and the detection circuit may be provided for every single pixel circuit serving as the pixel circuit, and the pixel control circuit may control the every single pixel circuit on a one-by-one basis.

This allows the AD conversion circuit to achieve a speedup of the AD conversion. In particular, in the case of using a global shutter, a problem of parasitic light sensitivity (PLS) arises due to an elongated standby time of the charge in the floating diffusion, but it is possible to achieve excellent PLS.

For example, the AD conversion circuit and the detection circuit may be provided for each set of a plurality of pixel circuits each serving as the pixel circuit. The pixel control circuit may control every single pixel circuit serving as the pixel circuit on a one-by-one basis. The detection circuit may compare the signal of the storage capacitance in a corresponding pixel circuit serving as the pixel circuit with the first reference value while synchronizing the corresponding pixel circuit and the pixel control circuit with each other.

In this way, the detection circuit and the pixel control circuit operate in synchronization with each other while targeting the same pixel circuit during exposure. This allows each of the plurality of pixel circuits that share the detection circuit and the pixel control circuit to operate in a pulse width modulation method.

For example, when the initialization count is zero, the pixel circuit may output a fourth signal in a low illumination mode for low illumination and output a fifth signal in a mode for high illumination higher than illumination in the low illumination mode, the fourth signal may be not retained in the sample-and-hold circuit and may be directly AD-converted by the AD conversion circuit, and the fifth signal may be retained in the sample-and-hold circuit, and the signal retained may be AD-converted by the AD conversion circuit. The pixel circuit may further include a second transfer transistor that transfers a charge stored in the storage capacitance to the floating diffusion, a first amplifier transistor that outputs the signal of the photodiode and the signal of the storage capacitance, a first selector transistor connected to the first amplifier transistor, a second amplifier transistor connected to the storage capacitance, and a second selector transistor connected to the second amplifier transistor. The detection circuit may be connected to the storage capacitance via the second selector transistor and the second amplifier transistor. In the low illumination mode, the pixel circuit may output the signal of the photodiode as the fourth signal from the first amplifier transistor via the first transfer transistor. The mode for high illumination may include a high illumination mode in which the pixel circuit outputs the signal of the storage capacitance as a sixth signal from the first amplifier transistor via the second transfer transistor. The sixth signal may belong to the fifth signal. The pixel control circuit may synchronize control of the first selector transistor, the second selector transistor, and the sample-and-hold circuit in the corresponding pixel circuit.

The pixel signal output from the first amplifier transistor is input to the AD conversion circuit via the first selector transistor and the sample-and-hold circuit and is AD-converted while the first selector transistor, the second selector transistor, and the sample-and-hold circuit are controlled in synchronization with one another. Similarly, the signal of the storage capacitance output from the second amplifier transistor continues to be detected by the detection circuit via the second selector transistor while the first selector transistor, the second selector transistor, and the sample-and-hold circuit are controlled in synchronization with one another. In this way, the first selector transistor, the second selector transistor, and the sample-and-hold circuit in each pixel circuit operate in synchronization with one another in accordance with the control signal received from the pixel control circuit. This allows accurate readout of the signal level of a pixel signal (in particular, a pixel signal for high illumination) for each pixel circuit.

For example, a plurality of pixel circuits, each serving as the pixel circuit, may correspond to pixels in a color filter array, and the pixel control circuit may perform the same pixel control on the plurality of pixel circuits in accordance with a maximum signal level of the pixels in the color filter array.

At the time of the WDR synthesis, even if the color temperature of a subject varies in a unit of color filter array, e.g., in a unit of the Bayer array consisting of four colors (R, Gr, B, and Gr), boundary portions serving as transition regions in the WDR can be changed in conjunction with one another by using the gain of the maximum level of signals among those of the four colors. Accordingly, the gains of respective colors become the same, and it is possible to prevent the occurrence of coloring due to a deviation in linearity of each color before and after the above boundary portions.

For example, the solid-state imaging device may further include a first semiconductor substrate that includes the pixel circuit, and a second semiconductor substrate that includes the detection circuit and the AD conversion circuit. The first semiconductor substrate and the second semiconductor substrate may be layered one above the other.

In the case where the first semiconductor substrate and the second semiconductor substrate are not layered one above the other, the area of the photodiode decreases. However, the layered structure allows the detection circuit and the AD conversion circuit to be provided without affecting the area of the photodiode.

For example, the first reference value may correspond to a saturation level of the storage capacitance.

In this case, the photodiode and the storage capacitance are initialized and the initialization count is counted when the storage capacitance is saturated.

A solid-state imaging device according to one aspect of the present disclosure includes a pixel circuit, and a detection circuit. The pixel circuit includes a photodiode, a floating diffusion to which a signal of the photodiode is read out, a storage capacitance that stores a charge overflowing from the photodiode, and reset means for initializing the photodiode, the floating diffusion, and the storage capacitance. The detection circuit includes a comparator that compares a signal of the storage capacitance with a first reference value, and an initialization circuit that controls the reset means in accordance with a comparison result obtained from the comparator. The pixel circuit is formed on a first semiconductor substrate that includes one or a plurality of semiconductor layers. The detection circuit is formed on a second semiconductor substrate that includes one or a plurality of semiconductor layers. The first semiconductor substrate and the second semiconductor substrate are layered one above the other.

When high-intensity (high-illumination) incident light is incident, a charge overflows from the photodiode and is stored in the storage capacitance. However, in some cases, the incident light may have such a high intensity that is even beyond the capacity of the storage capacitance. Even in such a case, when the signal of the storage capacitance has reached the first reference value, the photodiode and the storage capacitance are initialized to allow continuous charge storage. At this time, the number of times initialization is executed (initialization count) is counted so that it is possible to know the amounts of charges cleared in the photodiode and the storage capacitance by initialization. Then, the intensity of the incident light, even if it is high, can be calculated by using a mixed signal of the signal of the photodiode and the signal of the storage capacitance that are obtained when the signal of the storage capacitance can no more reach the first reference value and using the initialization count, i.e., the amounts of charges cleared from the photodiode and the storage capacitance by a single or multiple executions of initialization since the incidence of the incident light. Accordingly, it is possible to easily expand the dynamic range. For example, the dynamic range can be expanded more than in the case where the PWM method is not used.

For example, the pixel circuit may further include a first transfer transistor that reads out the signal of the photodiode to the floating diffusion, and a second transfer transistor that transfers the signal of the storage capacitance to the floating diffusion.

In this case, the signal of the photodiode under low illumination exposure (in the low illumination mode) is controlled by the first transfer transistor, and the signal of the storage capacitance under high illumination exposure (in the high illumination mode) is controlled by the second transfer transistor. This allows the former signal and the latter signal to be read out with different timing and used in the WDR synthesis. Accordingly, it is possible to further expand the dynamic range.

For example, the detection circuit may further include a counter function of counting a comparison result obtained from the comparator.

The provision of the detection circuit with the counter function of counting the comparison result obtained from the comparator allows higher-speed and more accurate counting. Accordingly, for example, even if high-illumination light is temporarily incident on some of the pixel circuits configuring a pixel array, it is possible to acquire the light without any loss and to improve the S/N ratio under high illumination conditions.

For example, the solid-state imaging device may further include an AD conversion function of converting a signal of the floating diffusion into a digital value, the AD conversion function being provided on the second semiconductor substrate. The comparator and the AD conversion function may have input terminals that are each connected to a different output terminal of the pixel circuit.

The solid-state imaging device disclosed in PTL 1 is incapable of reading out a low-illumination signal serving as a residual signal of the photodiode after PWM and accordingly has a degraded S/N ratio under low illumination conditions. However, according to the present embodiment, it is possible to improve the S/N ratio under low illumination conditions because a low-illumination signal serving as a residual signal can be read out after PWM by the AD conversion function and then subjected to signal processing.

For example, the solid-state imaging device may further include an AD conversion function of converting a signal of the floating diffusion into a digital value, the AD conversion function being provided on the second semiconductor substrate, and a selection circuit that receives input of the signal of the storage capacitance and the signal of the floating diffusion and selects an output, the selection circuit being formed on the first semiconductor substrate or the second semiconductor substrate. The output of the selection circuit may be input to the AD conversion function. The detection circuit and the AD conversion function may share the comparator.

The sharing of the comparator between the detection circuit and the AD conversion function reduces the area of the logic circuit.

Hereinafter, an embodiment will be described in detail with reference to the drawings.

Note that the embodiment described below shows a comprehensive or specific example. Numerical values, shapes, materials, constituent elements, layout positions and connection forms of constituent elements, steps, sequences of steps, and so on given in the following embodiment are merely examples and do not intend to limit the present disclosure.

EMBODIMENTS

Exemplary Configuration of Solid-State Imaging Device

A solid-state imaging device according to an embodiment will be described hereinafter.

Figure 1:
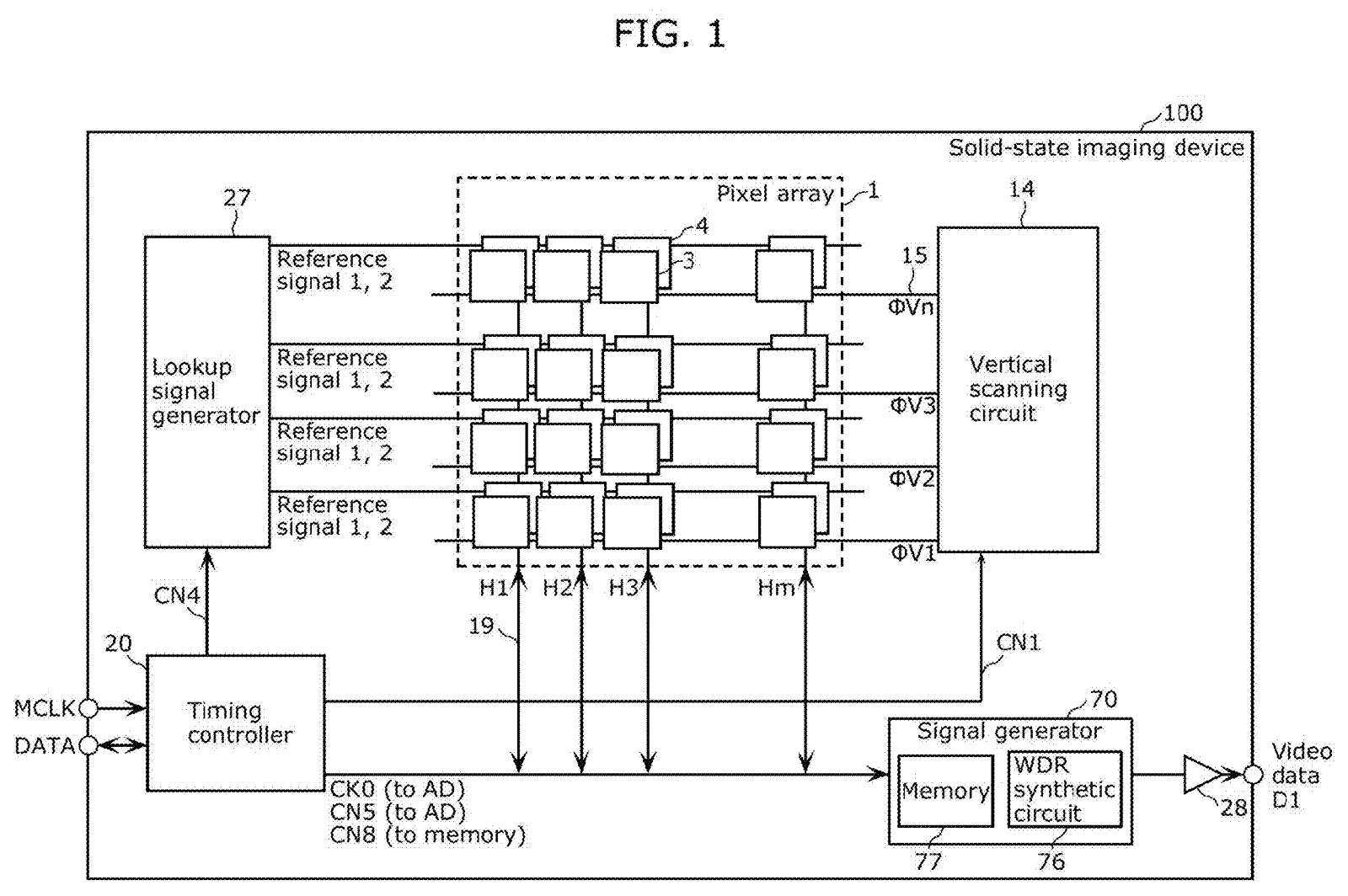

FIG. 1 is a block diagram showing an exemplary configuration of solid-state imaging device 100 according to the embodiment.

Solid-state imaging device 100 includes pixel array 1, vertical scanning circuit 14, input/output signal lines 19, timing controller 20, lookup signal generator 27, signal processor 70, and output circuit 28. Solid-state imaging device 100 further includes terminals such as an MCLK terminal for receiving input of a master clock signal from an outside source, a DATA terminal for transmitting and receiving commands or data from and to outside sources, and a D1 terminal for transmitting video data to an outside source and further includes, in addition to these terminals, other terminals for receiving supply of a power supply voltage and a ground voltage.

Pixel array 1 includes a plurality of pixel circuits 3 arranged in a matrix. Pixel circuits 3 output a plurality of pixel signals. Although details will be described later, the pixel signals may include, for example, a high-conversion gain (HCG) signal, a middle-conversion gain (MCG) signal, and a low-conversion gain (LCG) signal. Note that there are various exemplary configurations of pixel circuits 3, and as one exemplary configuration of pixel circuits 3, pixel circuits 3a, 3b, and 3c are described below. However, when there is no need to distinguish among pixel circuits 3a, 3b, and 3c, pixels circuits 3a, 3b, and 3c may be simply referred to as pixel circuits 3. Pixel circuits 3 are arranged in n rows and m columns in FIG. 1.

Pixel array 1 includes a plurality of logic circuits 4 that are provided in correspondence with pixel circuits 3. In the example shown in FIG. 1, pixel array 1 includes one logic circuit 4 for each pixel circuit 3. Alternatively, a plurality of logic circuits 4 may be provided for each pixel circuit 3. Logic circuits 4 have functions such as a function of A-D converting pixel signals that are output from pixel circuits 3. There are at least two types of pixel signals: reset components and signal components.

The AD-conversed pixel signals are output to signal processor 70 via input/output signal lines 19.

Vertical scanning circuit 14 simultaneously and collectively control horizontal scanning line group (also referred to as row control line group) 15 provided for each row of pixel circuits 3 within pixel array 1 in order to embody a global shutter (GS). Output signals from logic circuits 4 are simultaneously output to m input/output signal lines 19 (vertical signal lines) and transferred to signal processor 70.

In FIG. 1, n horizontal scanning line groups 15 (V1, V2, . . . , Vn) are provided for pixel circuits 3 and each group include, for example, control lines for reset transistors, transfer transistors, and selector transistors within each pixel circuit 3.

Timing controller 20 performs overall control of solid-state imaging device 100 by generating various control signal groups. The various control signal groups include counter clock signal CK0 and control signal groups CN1, CN4, CN5, and CN8. Timing controller 20 receives a master clock via the MCLK terminal and generates various internal clocks to control, for example, vertical scanning circuit 14.

Lookup signal generator 27 generates lookup signal RAMP including a triangular wave and outputs lookup signal RAMP to a plus input terminal of comparator 511 in AD conversion circuit 51, which will be described later. As shown in FIG. 2A and other drawings, lookup signal generator 27 includes reference signal generators 271 and 272. Reference signal generator 271 generates reference signal 1 and outputs reference signal 1 to logic circuit 4. Reference signal 1 is one example of a first reference value. Reference signal generator 272 generates reference signal 2 and outputs reference signal 2 to logic circuit 4. Reference signal 2 is one example of a second reference value. Reference signal 2 serves as lookup signal RAMP used in the AD conversion or as a saturation level of the HCG signal described later.

Signal processor 70 is a processor that performs WDR synthesis and includes WDR synthesizing circuit 76 and memory 77. Details of WDR synthesizing circuit 76 and memory 77 will be described later.

Output circuit 28 outputs digital pixel signals to the D1 terminal.

As described above, there are various exemplary configurations of pixel circuits 3, and such exemplary configurations will be described with reference to FIGS. 2A to 4.

Figure 3:
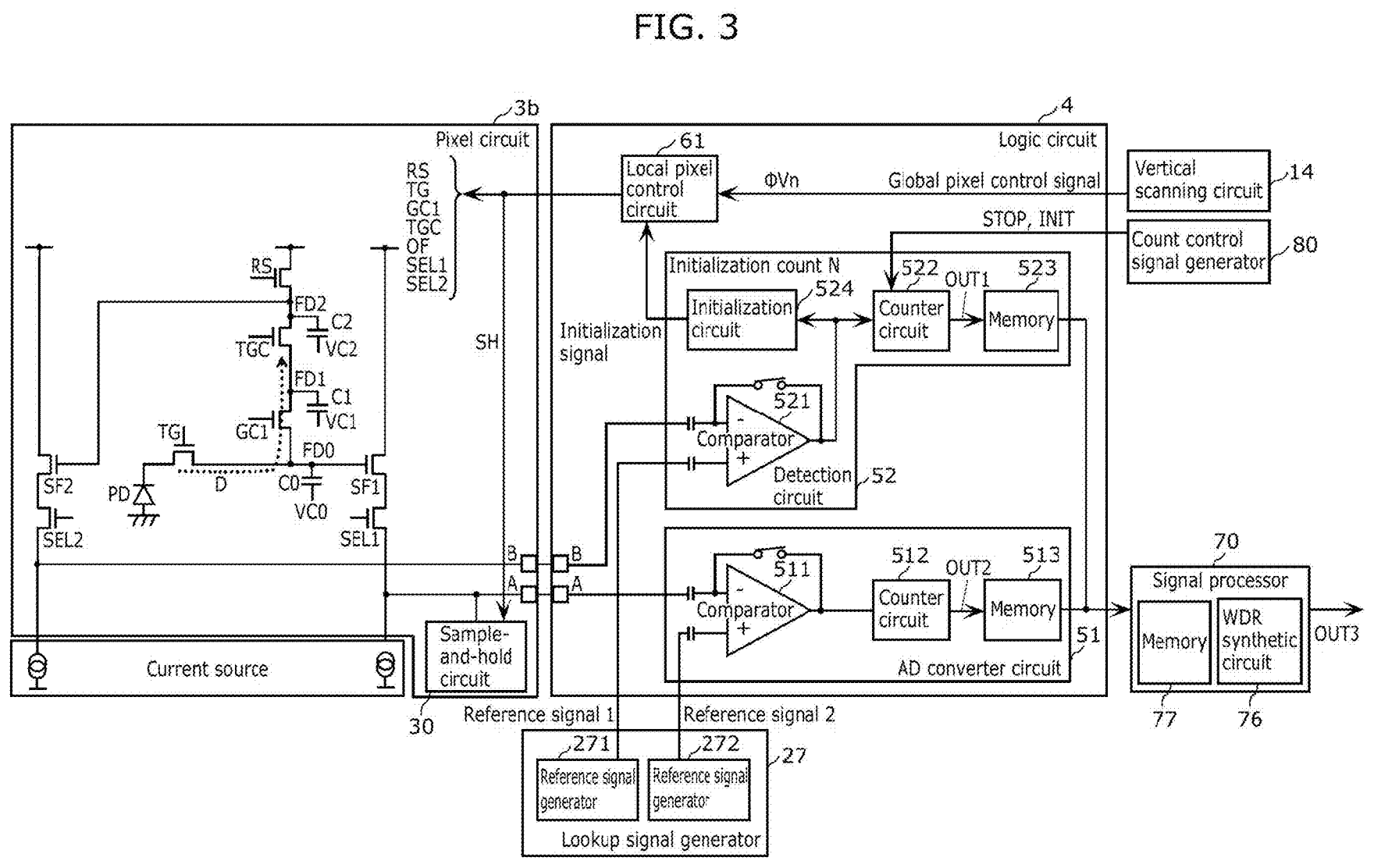
Figure 4:
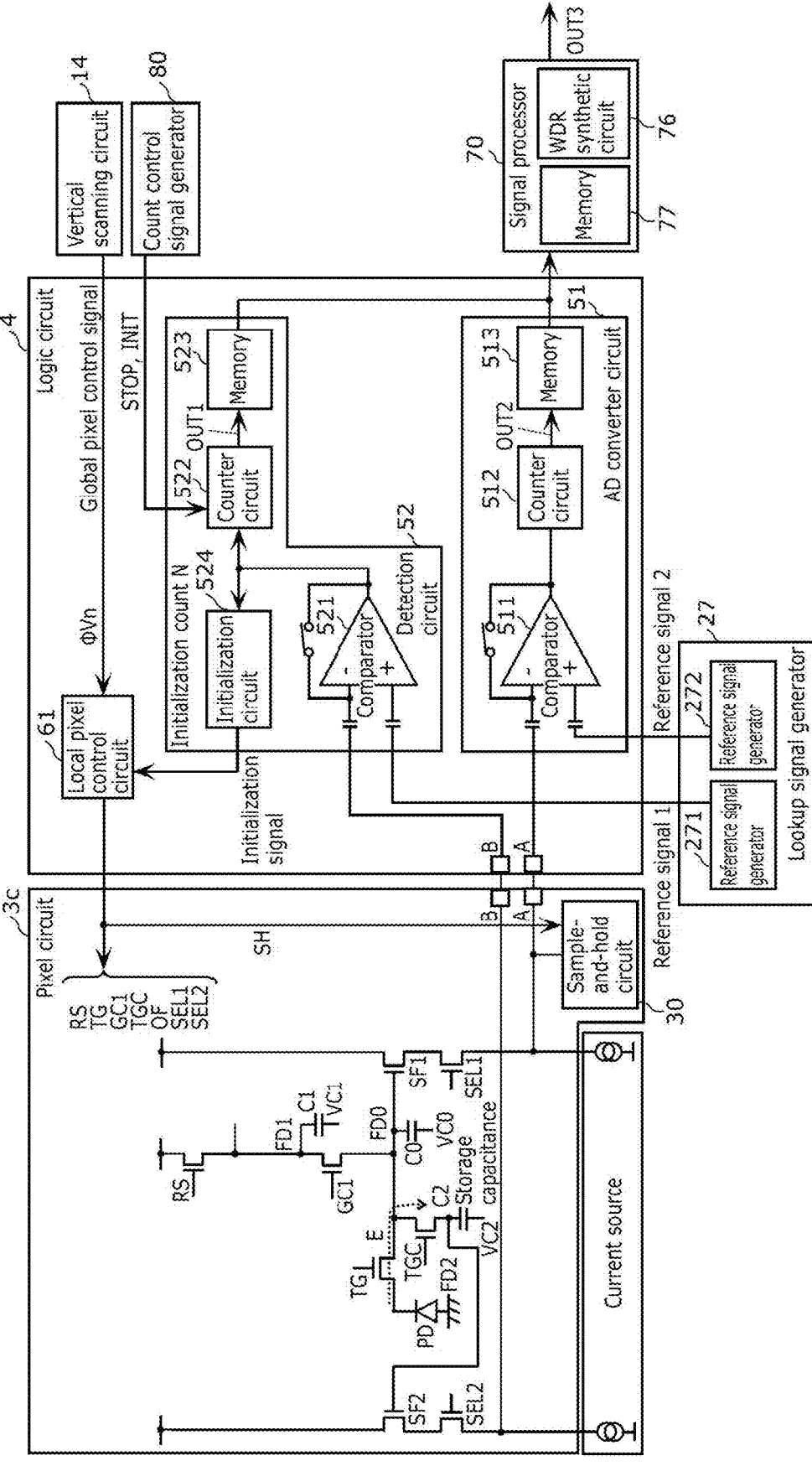
FIG. 4 is a block diagram showing other exemplary configurations of the pixel circuit and the logic circuit according to the embodiment.

FIGS. 2A to 4 are block diagrams showing exemplary configurations of one pixel circuit 3 and one logic circuit 4 according to the embodiment. FIGS. 2A to 2C show exemplary configurations of lateral overflow drain (OFD) pixel circuit 3, and FIGS. 3 and 4 show exemplary configurations of vertical OFD pixel circuit 3.

Exemplary Configurations of Pixel Configuration (with Horizontal OFD)

First, an exemplary configuration of horizontal OFD pixel circuit 3 will be described with reference to FIG. 2A.

FIG. 2A shows pixel circuit 3a as one of pixel circuits 3 arranged in a matrix in pixel array 1. Solid-state imaging device 100 may further include sample-and-hold circuit 30 connected to pixel circuit 3a. This configuration is suitable for a global shutter system.

Pixel circuit 3a has a horizontal OFD pixel configuration. The horizontal OFD is a configuration that includes a register circuit in the horizontal direction.

Pixel circuit 3a includes photodiode PD, transfer transistor TG, charge storages FD0, FD1, and FD2, amplifier transistors SF1 and SF2, reset transistor RS, and selector transistors SEL1 and SEL2. Pixel circuit 3a further includes storage capacitance C1, gain control transistor GC1, storage capacitance C2, and gain control transistor TGC. These components are arranged so as to be aligned in the horizontal direction from the viewpoint of charge transfer.

Photodiode PD is a photoelectric conversion element that converts incident light into a signal charge.

Charge storage FD0 may, for example, be a floating diffusion that is formed as a floating diffusion layer and retains the signal charge generated by photodiode PD. In the drawing, the storage capacitance of charge storage FD0 is referred to as storage capacitance C0.

Amplifier transistor SF1 outputs a pixel signal that depends on the signal charge stored in charge storage FD0, to logic circuit 4 via selector transistor SEL1. Amplifier transistor SF1 is one example of a first amplifier transistor that outputs a signal of photodiode PD and a signal of storage capacitance C2.

Selector transistor SEL1 is a switching element that selects whether to output a pixel signal to logic circuit 4 from amplifier transistor SF1. Selector transistor SEL1 is one example of a first selector transistor connected to amplifier transistor SF1.

Reset transistor RS is one example of reset means for initializing photodiode PD, charge storage FD0, and storage capacitance C2. Reset transistor RS is capable of achieving three ways of resetting under the control of gain control transistors GC1 and TGC. That is, reset transistor RS is capable of resetting charge storages FD0, FD1, and FD2. Note that the storage capacitance of charge storage FD1 is referred to as storage capacitance C1, and the storage capacitance of charge storage FD2 is referred to as storage capacitance C2.

The charge overflowing and transferred from charge storage FD0 in the ON state of transfer transistor TG is transferred to and retained in storage capacitance C1 as indicated by broken arrow line A in the drawing.

Gain control transistor GC1 controls the connection between charge storage FD0 and storage capacitance C1. Gain control transistor GC1 takes on the ON state and OFF state as a switching element. Gain control transistor GC1 is one example of a gain switching transistor that switches the gain of the signal of photodiode PD.

The signal charge overflowing from photodiode PD during exposure is transferred to and retained in storage capacitance C2 as indicated by broken arrow line B in the drawing. Here, overflow element OF exists between photodiode PD and storage capacitance C2. During exposure, the signal charge overflowing from photodiode PD is transferred to storage capacitance C2 via overflow element OF, instead of being transferred to storage capacitance C1 via transfer transistor TG. Storage capacitance C2 stores the charge overflowing from photodiode PD.

The signal charge overflowing from storage capacitance C2 is discharged to a power source via gain control transistor TGC and reset transistor RS.

As indicated by broken arrow line B, the signal charge overflowing from photodiode PD is stored in storage capacitance C2 without passing through charge storage FD0. This reduces the influence of dark current components on charge storage FD0. Besides, the presence of overflow element OF enables controlling the overflow level and channel depth of the charge, thereby reducing the influence of dark current components generated in the surface layer.

Gain control transistor TGC is a transistor for gain control that controls the connection between storage capacitance C1 and storage capacitance C2. Gain control transistor TGC takes on the ON state and the OFF state as a switching element. Gain control transistor TGC is one example of a second transfer transistor that transfers the charge (signal) stored in storage capacitance C2 to charge storage FD0.

In order to retain the signal charge overflowing from photodiode PD, register circuits are provided for overflow, each using a switching element and a storage capacitance as one set. The register circuit in the first row is a set of gain control transistor GC1 and storage capacitance C1. The register circuit in the second row is a set of gain control transistor TGC and storage capacitance C2.

For example, in the global shutter system, all pixels are exposed at the same time, and then signals of all the pixels are read out at the same time to sample-and-hold circuit 30. This exemplary configuration achieves both expansion of the dynamic range and an improvement in S/N ratio.

Logic circuit 4 includes AD conversion circuit 51, detection circuit 52, and local pixel control circuit 61. In the present embodiment, when AD conversion circuit 51 and detection circuit 52 are provided for each or a plurality of pixel circuits 3a, a pixel control circuit that controls pixel circuit 3a is in particular referred to as local pixel control circuit 61.

AD conversion circuit 51 is one example of an AD conversion function of converting a signal of charge storage FD0 into a digital value. AD conversion circuit 51 includes comparator 511, counter circuit 512, and memory 513.

Comparator 511 compares an analog pixel signal output from pixel circuit 3a with a RAMP waveform (i.e., a triangular wave) generated by lookup signal generator 27 and serving as reference signal 2 and, for example when the former is larger than the latter, inverts an output signal that indicates the comparison result.

Counter circuit 512 counts the amount of time from when the triangular wave within lookup signal RAMP serving as reference signal 2 starts to change to when the output signal of comparator 511 is inverted. Since the amount of time until inversion is determined depending on the value of the analog pixel signal, the count value serves as a digitized pixel signal. In this way, AD conversion is performed.

Memory 513 retains the count value of counter circuit 512, i.e., digital pixel signals.

Detection circuit 52 is connected to storage capacitance C2 via selector transistor SEL2 and amplifier transistor SF2. Detection circuit 52 practices the PWM method. Detection circuit 52 compares the signal of storage capacitance C2 with reference signal 1 and, when the signal of storage capacitance C2 has reached reference signal 1, initializes photodiode PD and storage capacitance C2 almost at the same time via local pixel control circuit 61 and counts initialization count N. Local pixel control circuit 61 is one example of a pixel control circuit that controls pixel circuit 3a. Detection circuit 52 includes comparator 521, counter circuit 522, memory 523, and initialization circuit 524.

Comparator 521 compares the signal of storage capacitance C2 with reference signal 1. When storage capacitance C2 has reached reference signal 1 that indicates the saturation level, detection circuit 52 causes comparator 521 to invert the output signal, causes counter circuit 522 to count the number of times the output signal is inverted, i.e., initialization count N, and causes memory 523 to store initialization count N. Counter circuit 522 is one example of a counter function of counting the comparison result obtained from comparator 521.

Initialization circuit 524 controls reset transistor RS in accordance with the comparison result obtained from comparator 521. Specifically, when storage capacitance C2 has reached reference signal 1 indicating the saturation level, i.e., when the inverted output signal of comparator 521 is input, initialization circuit 524 outputs an initialization signal to local pixel control circuit 61 so as to drive local pixel control circuit 61. Local pixel control circuit 61 performs pixel control necessary for initialization.

In the circuit shown in FIG. 2A, the input terminals of comparator 521 and AD conversion circuit 51 are connected to different output terminals of pixel circuit 3a.

For example, detection circuit 52 may discharge the charges stored in photodiode PD and storage capacitance C2 to initialize photodiode PD and storage capacitance C2 by controlling reset transistor RS, transfer transistor TG, and gain control transistor TGC via local pixel control circuit 61 in accordance with the result of comparison between the signal of storage capacitance C2 and reference signal 1.

In the global shutter, logic circuit 4 is capable of expanding the dynamic range by adopting the PWM method into pixel circuit 3a having an overflow structure. Moreover, as will be described later, AD conversion circuit 51 performs a selective readout operation of reading out at least two pixel signals from among a plurality of pixel signals without performing redundant readout operations of reading out all of the pixel signals. By reducing a plurality of pixel signals to at least two pixel signals, it is possible to enhance yield and reduce the numbers of bits in memory 513 and memory 523 as well as to achieve a speedup and a reduction in power consumption in downstream processes. Signal processor 70 is also capable of achieving a speedup and a reduction in power consumption and capable of maintaining the dynamic range equivalent to that in the case of using a greater number of (at least three) pixel signals.

In the global shutter system, all pixels are exposed at the same time and then the signals of all pixels are read out at the same time to sample-and-hold circuit 30. Or, the signals of all the pixels are directly AD-converted by AD conversion circuit 51. Then, AD conversion circuit 51 supplies a plurality of pixel signals to signal processor 70.

Figure 2B:
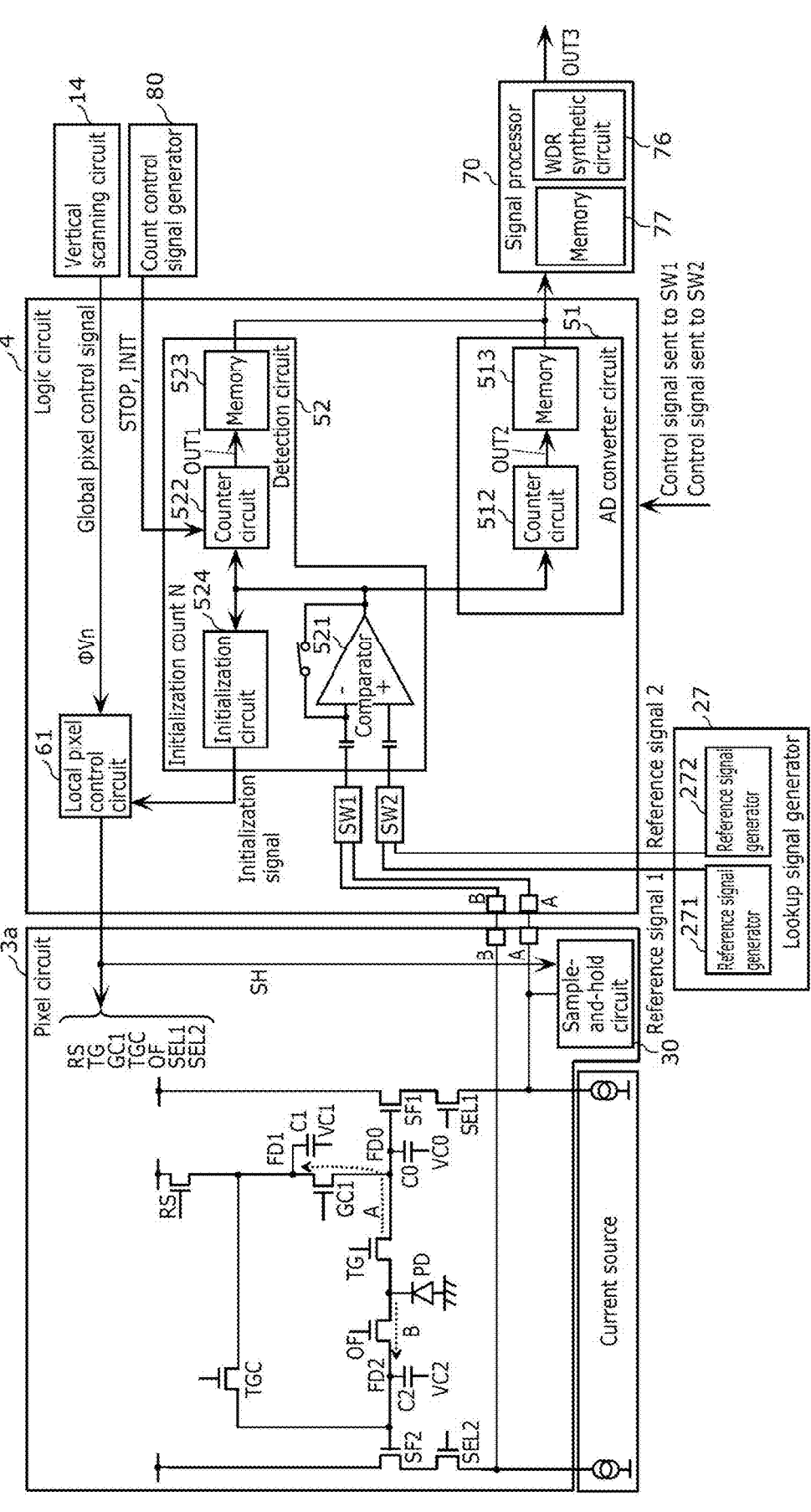
FIG. 2B is a block diagram showing the exemplary configurations of the pixel circuit and the logic circuit according to the embodiment.
Figure 2C:
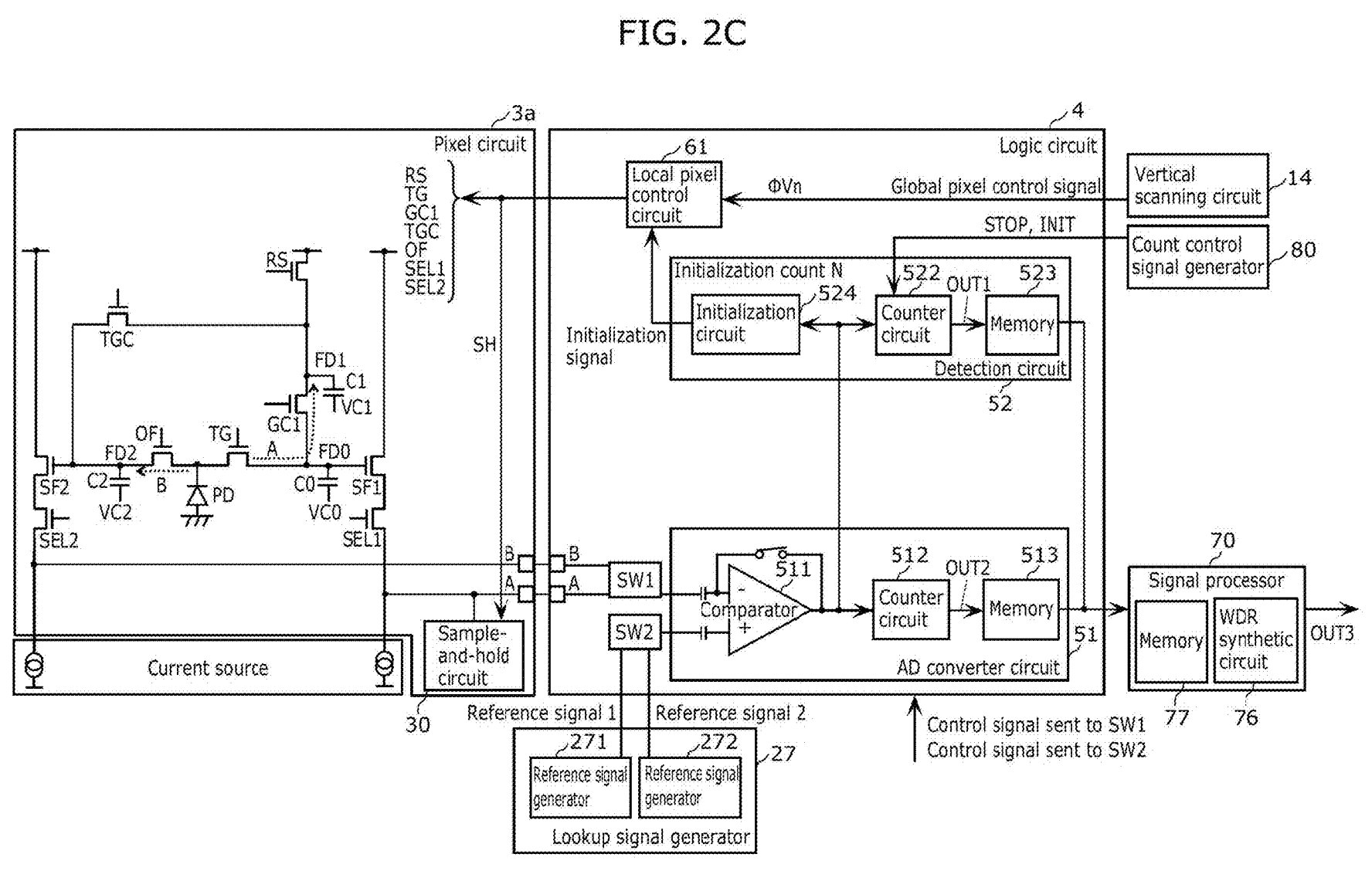

The circuits shown in FIGS. 2B and 2C are variations of the circuit shown in FIG. 2A, and detection circuit 52 and AD conversion circuit 51 share one comparator. FIG. 2B shows an example in which detection circuit 52 and AD conversion circuit 51 share comparator 521, and FIG. 2C shows an example in which detection circuit 52 and AD conversion circuit 51 share comparator 511.

As shown in FIGS. 2B and 2C, solid-state imaging device 100 (logic circuit 4) may include selection circuit SW1 that receives input of signals from storage capacitance C2 and charge storage FD0, and selects an output. Solid-state imaging device 100 (logic circuit 4) may further include selection circuit SW2.

In FIG. 2B, selection circuit SW1 receives input of the signal of storage capacitance C2 and the signal of charge storage FD0 and inputs a selected signal to one end of comparator 521. Meanwhile, selection circuit SW2 receives input of reference signal 1 of reference signal generator 271 and reference signal 2 of reference signal generator 272 and inputs a selected signal to the other end of comparator 521.

In FIG. 2C, selection circuit SW1 receives input of the signal of storage capacitance C2 and the signal of charge storage FD0 and inputs a selected signal to one end of comparator 511. Meanwhile, selection circuit SW2 receives input of reference signal 1 of reference signal generator 271 and reference signal of reference signal generator 272 and inputs a selected signal to the other end of comparator 511.

In the same manner as in the operating principle in FIG. 2A, the signal of storage capacitance C2 is compared with reference signal 1, and the signal of charge storage FD0 is compared with reference signal 2. The former comparison operation is performed during the exposure time, and the latter comparison operation is performed during the AD conversion (ADC) time exclusively in terms of time in accordance with control signals of selection circuits SW1 and SW2.

In this way, the sharing of the comparator between detection circuit 51 and AD conversion circuit 52 reduces the area of logic circuit 4.

Figure 5:
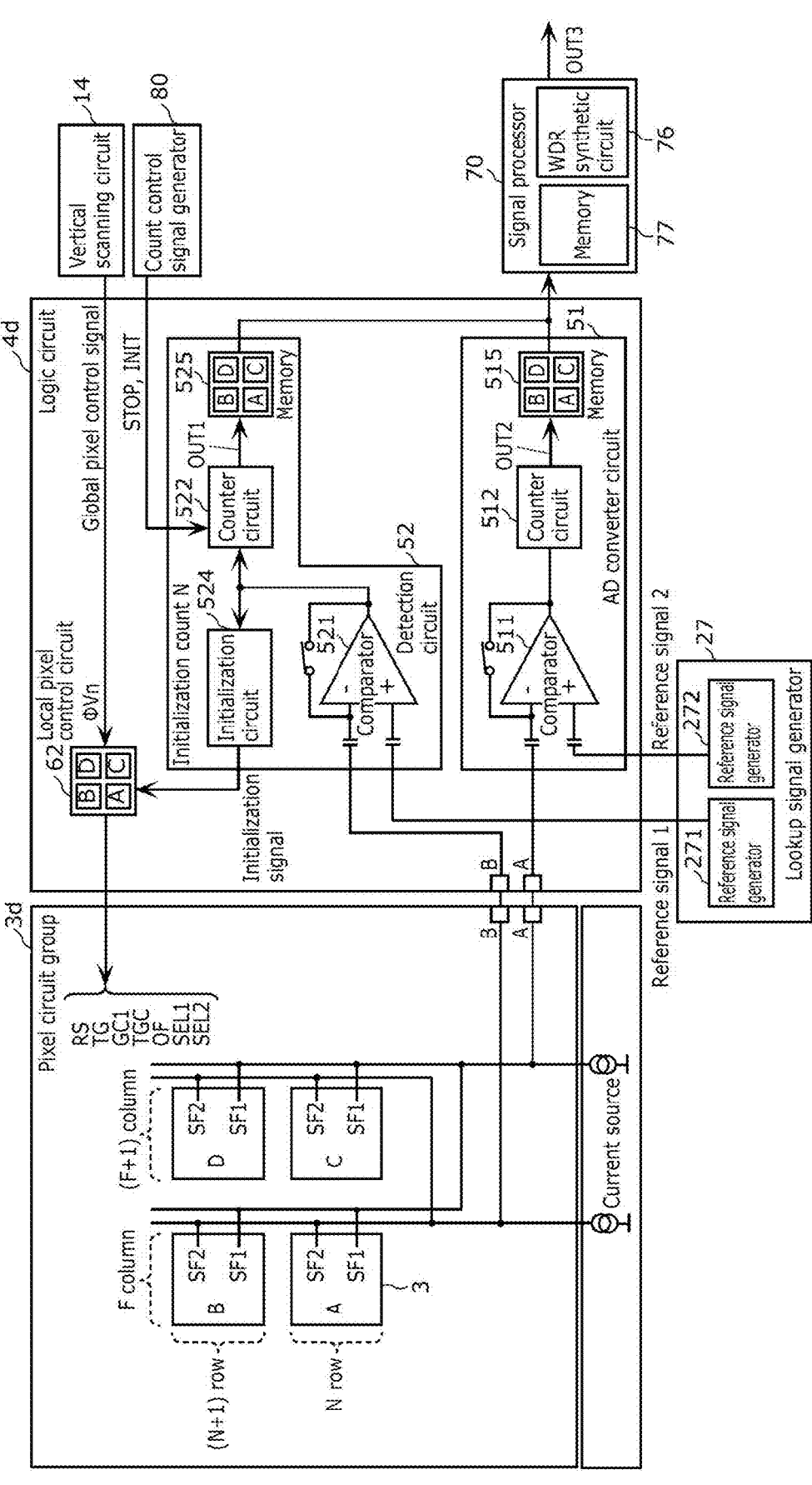
FIG. 5 is a diagram for describing sharing of the logic circuit among a plurality of pixel circuits.

Note that the sharing of one comparator between detection circuit 51 and AD conversion circuit 52 may also be adopted into FIGS. 3 to 5 in the same manner as in described FIG. 2B or 2C.

Exemplary Configuration 1 of Pixel Configuration (with Vertical OFD)

Next, exemplary configuration 1 of pixel circuit 3 with vertical OFD will be described with reference to FIG. 3.

Exemplary configuration 1 with vertical OFD is a configuration in which the horizontal OFD register circuits described above are connected in two rows in the longitudinal direction.

FIG. 3 shows pixel circuit 3b as one of a plurality of pixel circuits 3 arranged in a matrix in pixel array 1. Solid-state imaging device 100 may further include sample-and-hold circuit 30 connected to pixel circuit 3b. This configuration is suitable for the global shutter system.

The following description of pixel circuit 3b focuses on differences from pixel circuit 3a.

In pixel circuit 3b, storage capacitance C1, gain control transistor GC1, storage capacitance C2, and gain control transistor TGC are arranged so as to be aligned in the longitudinal direction from the viewpoint of charge transfer.

The signal charge overflowing from photodiode PD during exposure is transferred to and retained in storage capacitance C1 as indicated by broken arrow line D in the drawing. The signal charge overflowing from storage capacitance C1 is transferred to and retained in storage capacitance C2.

Storage capacitance C1 retains the signal charge overflowing from photodiode PD. For example, storage capacitance C1 stores the signal charge overflowing from photodiode PD via transfer transistor TG and gain control transistor GC1 during exposure.

Gain control transistor GC1 controls the connection between charge storage FD0 and storage capacitance C1. Gain control transistor GC1 takes on the ON state and the OFF state as a switching element. Note that the gate voltages of transfer transistor TG and gain control transistor GC1 may not necessarily be completely in the OFF state during exposure, and the configuration may be such that the signal charge overflowing from photodiode PD is transferred from transfer transistor TG to storage capacitance C1 via charge storage FD0 and gain control transistor GC1.

Storage capacitance C2 retains the signal charge overflowing from storage capacitance C1. For example, storage capacitance C2 may store the signal charge overflowing from storage capacitance C1 via gain control transistor TGC.

Gain control transistor TGC controls the connection between storage capacitance C1 and storage capacitance C2. Gain control transistor TGC takes on the ON state and the OFF state as a switching element. Note that the gate voltage of gain control transistor TGC may not necessarily be completely in the OFF state during exposure, and the configuration may be such that the signal charge overflowing from storage capacitance C1 is transferred to storage capacitance C2 via gain control transistor TGC.

This exemplary configuration achieves both expansion of the dynamic range and an improvement in S/N ratio.

Logic circuit 4 is the same as that described in FIG. 2A, and therefore a redundant description thereof shall be omitted.

Exemplary Configuration 2 of Pixel Configuration (with Vertical OFD)

Next, exemplary configuration 2 of pixel circuit 3 with vertical OFD will be described with reference to FIG. 4. Exemplary configuration 2 with vertical OFD is a variation of exemplary configuration 1 with vertical OFD described above.

FIG. 4 shows pixel circuit 3c as one of pixel circuits 3 arranged in a matrix in pixel array 1. Solid-state imaging device 100 may further include sample-and-hold circuit 30 connected to pixel circuit 3c. This configuration is suitable for the global shutter system.

The following description of pixel circuit 3c focuses on differences from pixel circuit 3a.

In pixel circuit 3c, storage capacitance C1, gain control transistor GC1, storage capacitance C2, and gain control transistor TGC are arranged so as to be aligned in the longitudinal direction from the viewpoint of charge transfer.

The signal charge overflowing from photodiode PD during exposure is transferred to and retained in storage capacitance C2 as indicated by broken arrow line E in the drawing.

Gain control transistor GC1 controls the connection between charge storage FD0 and storage capacitance C1. Gain control transistor GC1 takes on the ON state and the OFF state as a switching element.

Storage capacitance C2 retains the signal charge overflowing from photodiode PD. For example, storage capacitance C2 stores the signal charge overflowing from photodiode PD via transfer transistor TG and gain control transistor TGC during exposure. Note that the gate voltages of transfer transistor TG and gain control transistor TGC may not necessarily be completely in the OFF state during exposure, and the configuration may be such that the signal charge overflowing from photodiode PD is transferred from transfer transistor TG to storage capacitance C2 via charge storage FD0 and gain control transistor TGC.

Gain control transistor TGC controls the connection between charge storage FD0 and storage capacitance C2. Gain control transistor TGC takes on the ON state and the OFF state as a switching element.

This exemplary configuration achieves both expansion of the dynamic range and an improvement in S/N ratio.

Logic circuit 4 is the same as that described in FIG. 2A, and therefore a redundant description thereof shall be omitted.

Sharing of Pixel Circuit

While FIGS. 2A to 4 describe examples in which AD conversion circuit 51 and detection circuit 52 are provided for every single pixel circuit 3, and local pixel control circuit 61 controls every single pixel circuit 3 on a one-by-one basis, AD conversion circuit 51 and detection circuit 52 may be provided for each set of a plurality of pixel circuits 3, and local pixel control circuit 62 may control every single pixel circuit 3 on a one-by-one basis. This will be described with reference to FIG. 5.

FIG. 5 is a diagram for describing the sharing of logic circuit 4d among a plurality of pixel circuits 3. In FIG. 5, pixel circuits A to D are shown as pixel circuits 3 and referred to as pixel circuit group 3d. Note that any of pixel circuits 3a, 3b, and 3c may be adopted as each pixel circuit 3. Logic circuit 4d will be described focusing on differences from logic circuit 4.

Pixel circuit group 3d (pixel circuits A to D) shares one AD conversion circuit 51 and one detection circuit 52. Note that memory 515 included in AD conversion circuit 51 and memory 525 included in detection circuit 52 each have a region for each pixel circuit 3. FIG. 5 schematically shows that memory 515 and memory 525 each have a region for each of pixel circuits A to D, and these regions are denoted by A to D within memory 515 and memory 525.

Local pixel control circuit 62 is one example of a pixel control circuit that controls every single pixel circuit 3 on a one-by-one basis. FIG. 5 schematically shows that local pixel control circuit 62 controls every single pixel circuit 3 on a one-by-one basis, and pixel circuits 3 are denoted by A to D within local pixel control circuit 62.

Detection circuit 52 compares the signal of storage capacitance C2 in corresponding pixel circuit 3 with reference signal 1 while synchronizing corresponding pixel circuit 3 and local pixel control circuit 62. For example, detection circuit 52 compares the signal of storage capacitance C2 in pixel circuit A with reference signal 1 while synchronizing pixel circuit A and local pixel control circuit 62. By so doing, it is possible to determine, for each pixel circuit 3, whether storage capacitance C2 has reached reference signal 1 indicating the saturation level.

Local pixel control circuit 62 further synchronizes control of selector transistor SEL1, selector transistor SEL2, and sample-and-hold circuit 30 in corresponding pixel circuit 3. For example, sample-and-hold circuit 30 may include capacitance element CR for reset components and capacitance element CS for signal components, and local pixel control circuit 62 synchronizes control of selector transistor SEL1, selector transistor SEL2, and capacitance elements CR and CS in corresponding pixel circuit 3. Capacitance element CR is one example of a first sample-and-hold capacitance element, and capacitance element CS is one example of a second sample-and-hold capacitance element.

During exposure, AD conversion circuit 51 and detection circuit 52 are synchronized with each other so as to target the same pixel circuit 3. For target pixel circuit 3, the values of pixel signals are retained in the region for target pixel circuit 3 in memory 515 of AD conversion circuit 51, initialization count N detected by detection circuit 52 is retained in the region for target pixel circuit 3 in memory 525, and local pixel control circuit 62 independently controls selector transistor SEL1, selector transistor SEL2, and sample-and-hold circuit 30 in target pixel circuit 3 while synchronizing them. This configuration allows operations using the PWM method to be executed on pixel circuits 3 during exposure.

Since the detection is conducted on pixel circuit group 3d in order of, for example, pixel circuits A, B, C, and D, the timing of detection by detection circuit 52 differs for each pixel circuit 3 and a delay arises from when the signal of storage capacitance C2 has exceeded reference signal 1 until when this fact is actually detected by detection circuit 52. However, for each pixel circuit 3, a signal component at the saturation level is retained in sample-and-hold capacitance element CS of sample-and-hold circuit 30 at the point in time when detection circuit 52 has detected storage capacitance C2 had reached the saturation level. Accordingly, it is possible to properly retain the signal component for each pixel circuit 3 at the point in time when detection circuit 52 obtains the detection result. Then, for each pixel circuit 3, CDS of signal components is performed by using reset components retained in advance in capacitance element CR at the time of initialization of storage capacitance C2 and photodiode PD. This allows accurate detection of the signal at the saturation level of storage capacitance C2. In this way, the PWM method can be used even in the case where one detection circuit 52 is shared among pixel circuits 3.

This is particularly effective when AD conversion circuit 51 and detection circuit 52 are not provided for every single pixel circuit 3 within a minute cell.

Sample-and-Hold Circuit

Figure 6:
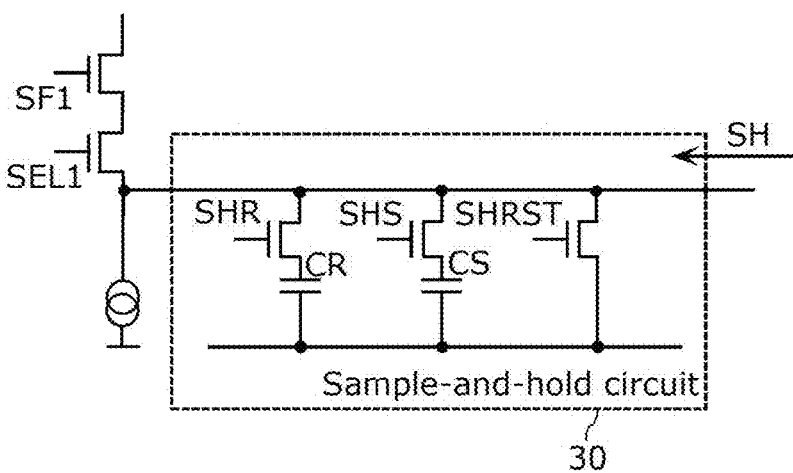
FIG. 6 is a diagram showing an exemplary configuration of a sample-and-hold circuit.

FIG. 6 is a diagram showing an exemplary configuration of sample-and-hold circuit 30.

Reset components are retained in capacitance element CR in accordance with sample-and-hold signal SHR. Signal components are retained in capacitance element CS in accordance with sample-and-hold signal SHS. Capacitance elements CR and CS can be discharged when sample-and-hold signal SHRST is set to a high level.

Among a plurality of pixel signals including HCG signals, MCG signals, and LCG signals, at least one pixel signal is not retained in sample-and-hold circuit 30 and is directly AD-converted by AD conversion circuit 51. Among these pixel signals, at least one other pixel signal is retained in sample-and-hold circuit 30, and the signal retained is AD-converted by AD conversion circuit 51.

Dynamic Range Expansion in WDR

WDR synthesizing circuit 76 of signal processor 70 will be described hereinafter. WDR synthesizing circuit 76 is one example of a WDR processor. WDR synthesizing circuit 76 performs WDR synthesis in which a plurality of pixel signals output from pixel circuit 3 are synthesized together. As described above, the pixel signals include the HCG signal, the MCG signal, and the LCG signal.

Signal processor 70 (WDR synthesizing circuit 76) calculates a first signal that indicates the intensity of the incident light, in accordance with initialization count N and a mixed signal of the signal of storage capacitance C2 and the signal of photodiode PD that has been read out to charge storage FD0 by transfer transistor TG.

When initialization count N is one or more, pixel circuit 3 outputs saturation signal Qsat of the LCG signal and initializes photodiode PD and storage capacitance C2a during exposure, the saturation signal being a mixed signal of the signal of photodiode PD and the signal of storage capacitance C2 that are obtained when the signal of storage capacitance C2 has reached reference signal 1. Saturation signal Qsat is retained in sample-and-hold circuit 30, and the signal retained is AD-converted by AD conversion circuit 51. Pixel circuit 3 outputs a residual signal of the LCG signal at the end of the exposure, the residual signal being a mixed signal of the signal of storage capacitance C2 and the signal of photodiode PD that are remaining in photodiode PD and storage capacitance C2 due to the signal of storage capacitance C2 not reaching reference signal 1. The residual signal is not retained in sample-and-hold circuit 30 and is directly AD-converted by AD conversion circuit 51. The first signal includes the residual signal and saturation signal Qsat of the LCG signal. Saturation signal Qsat is one example of a second signal, and the residual signal is one example of a third signal. Signal processor 70 (WDR synthesizing circuit 76) calculates the first signal by computing a sum of the residual signal and a product of saturation signal Qsat and initialization count N.

When initialization count N is one or more during exposure, sample-and-hold circuit 30 initializes photodiode PD and storage capacitance C2 and then retains a reset component in capacitance element CR. When the signal of storage capacitance C2 has reached reference signal 1 during exposure, sample-and-hold circuit 30 retains saturation signal Qsat as a signal component in capacitance element CS. Then, AD conversion circuit 51 performs AD conversion of a pixel signal level by comparing the pixel signal level with reference signal 2, the pixel signal level being obtained by deducting the reset component from the signal component.

When initialization count N is zero, pixel circuit 3 outputs the HCG signal in the low illumination mode for low illumination. The HCG signal is one example of a fourth signal. When initialization count N is zero, pixel circuit 3 also outputs the MCG signal or the LCG signal in the mode for high illumination higher than illumination in the low illumination mode. The LCG signal is one example of a sixth signal. The MCG signal is one example of a seventh signal. The LCG signal and the MCG signal belong to the fifth signal.

In the low illumination mode, pixel circuit 3 outputs the signal of photodiode PD as the HCG signal from amplifier transistor SF1 via transfer transistor TG. Specifically, the low illumination mode is a mode in which storage capacitance C0 is used among storage capacitances C0, C1, and C2 and in which the sensitivity to the low-illumination incident light is high.

The mode for high illumination higher than illumination in the low illumination mode includes a middle illumination mode and a high illumination mode.

In the middle illumination mode, pixel circuit 3 outputs the signal of photodiode PD as the MCG signal from amplifier transistor SF1 by controlling gain control transistor GC1. Specifically, the middle illumination mode is a mode in which storage capacitances C0 and C1 are used among storage capacitances C0, C1, and C2 and in which it is possible to detect middle-illumination incident light.

In the high illumination mode, pixel circuit 3 outputs the signal of storage capacitance C2 as the LCG signal from amplifier transistor SF1 via gain control transistors TGC and GC1. Specifically, the high illumination mode is a mode in which storage capacitances C0, C1, and C2 are used and in which it is possible to detect high-illumination incident light.

The HCG signal is not retained in sample-and-hold circuit 30 and is directly AD-converted by AD conversion circuit 51. The MCG signal or the LCG signal is retained in sample-and-hold circuit 30, and the signal retained is AD-converted by AD conversion circuit 51.

When initialization count N is one or more, WDR synthesizing circuit 76 generates an output signal from at least the first signal. When initialization count N is zero, WDR synthesizing circuit 76 generates an output signal from at least one of the HCG signal, the MCG signal, or the LCG signal. The generated output signal is output to output circuit 28.

Although details will be described later, in the WDR synthesis, pixel signals that are used to generate an output signal can be determined from only the HCG signal among a plurality of pixel signals. This reduces the number of pixel signals output from pixel circuits 3 and accordingly speeds up readout in logic circuit 4. Besides, the number of bits in memory 513 and the number of bits in memory 523 in logic circuit 4 are also reduced. This allows area reduction and suppresses a decrease in yield.

In exposure control for three frames obtained by high illumination exposure (high illumination mode), middle illumination exposure (middle illumination mode), and low illumination exposure (low illumination mode) in the WDR synthesis, the three frames are exposed with completely the same timing by using completely the same pixels in the global shutter system. Thus, there occur no false colors, no coloring, and no temporal shifts. That is, since each frame is exposed simultaneously, there are no temporal shifts and coloring among the frames.

A pixel signal in the frame of a low-illumination reign (low illumination exposure) is the HCG signal whose gain within a pixel is set to high. A pixel signal in the frame of a middle-illumination region (middle illumination exposure) is the MCG signal whose gain within a pixel is set to middle. A pixel signal in the frame of a high-illumination region (high illumination exposure) is the LCG signal whose gain within a pixel is set to low. The use of these pixel signals improves noise under low-illumination conditions and expands the dynamic range under high-illumination conditions.

Figure 7:
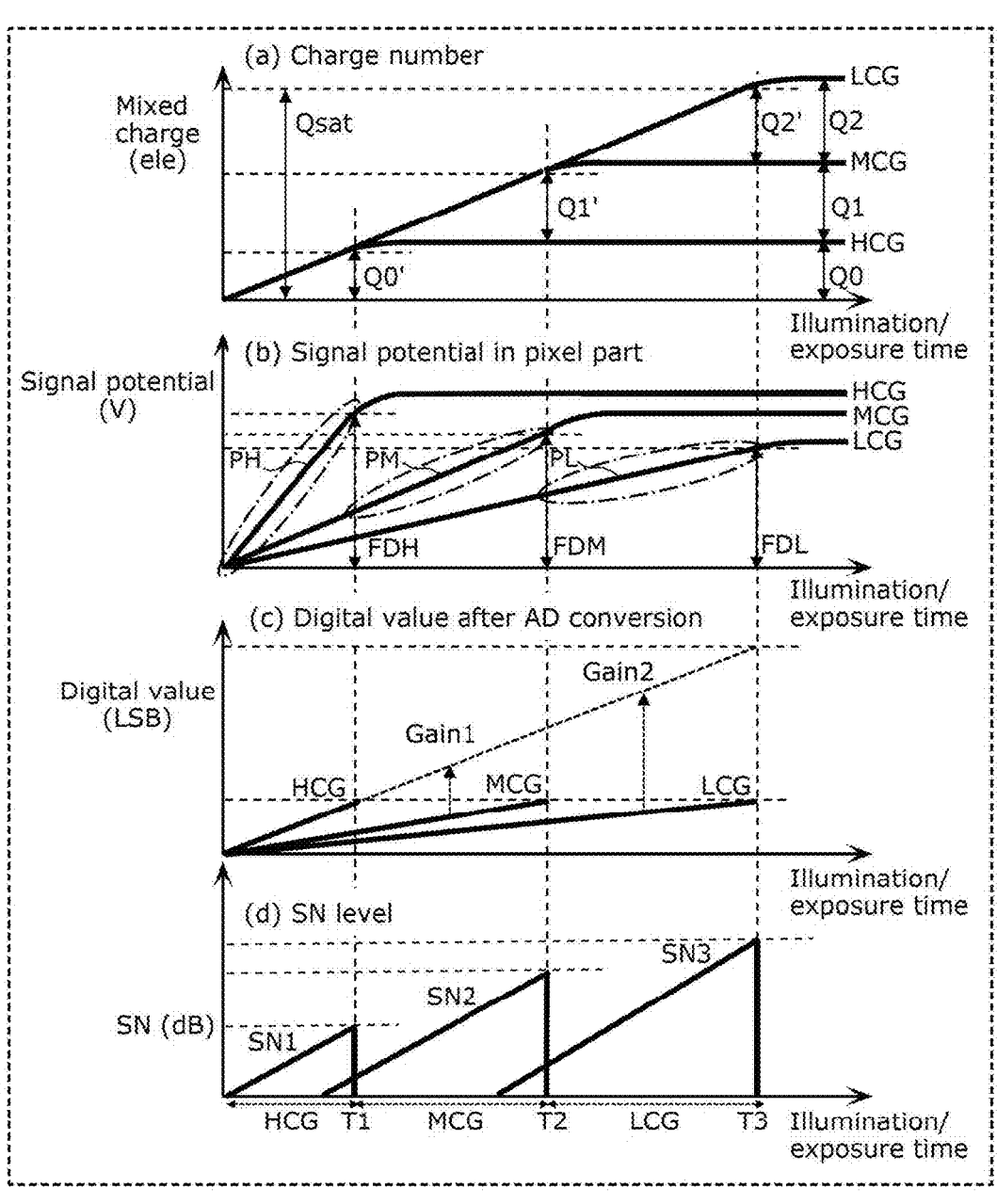
FIG. 7 is a diagram showing an overview of a method of performing WDR synthesis within a pixel.

FIG. 7 is a diagram showing an overview of the method of performing WDR synthesis within a pixel.

Figure 8:
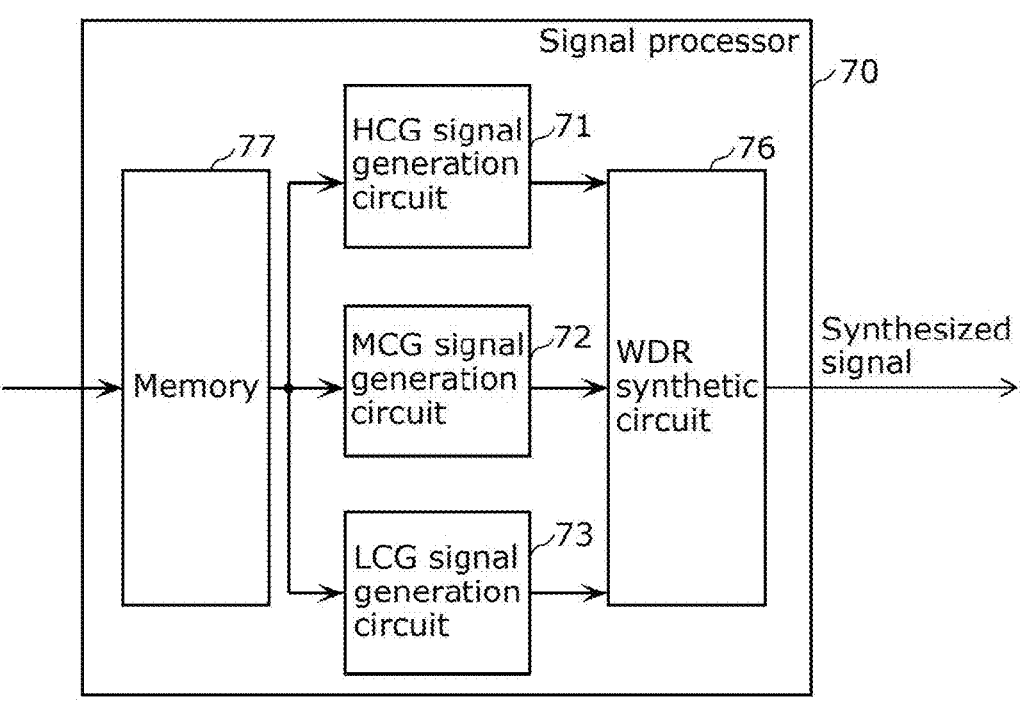
FIG. 8 is a diagram showing an exemplary configuration of a signal processor that performs WDR synthesis using three signals.

FIG. 8 is a diagram showing an exemplary configuration of signal processor 70 that performs WDR synthesis using three signals. In this example, signal processor 70 includes HCG-signal generation circuit 71, MCG-signal generation circuit 72, and LCG-signal generation circuit 73. HCG-signal generation circuit 71 generates the HCG signal from the digital values of pixel signals in the low illumination mode. MCG-signal generation circuit 72 generates the MCG signal from the digital values of pixel signals in the middle illumination mode. LCG-signal generation circuit 73 generates the LCG signal from the digital values of pixel signals in the high illumination mode.

The WDR synthesis is conducted using signal charge Q0 (charge in storage capacitance C0) for the HCG signal obtained under low illumination exposure (in the low illumination mode), signal charges Q0 and Q1 (charges in storage capacitances C0 and C1) for the MCG signal obtained under middle illumination exposure (in the middle illumination mode), and signal charges Q0, Q1, and Q2 (charges in storage capacitances C0, C1, and C1) for the LCG signal obtained under high illumination exposure (in the high illumination mode). The horizontal axes in (a) to (d) in FIG. 7 represent the product of the illumination and the exposure time, the illumination during a fixed period of time, or the exposure time under fixed illumination conditions. The vertical axis in (a) in FIG. 7 represents the charge storage level, the vertical axis in (b) in FIG. 7 represents the signal potential of the pixel part, the vertical axis in (c) in FIG. 7 represents the value obtained by AD conversion, and the vertical axis in (d) in FIG. 7 represents the S/N level.

In FIG. 7, (c) and (d) are diagrams for describing details of WDR synthesizing circuit 76 that configures signal processor 70. At boundary T1 serving as a transition region between low illumination exposure and middle illumination exposure in "Illumination/exposure time", the charge in storage capacitance C0 becomes charge Q0' that is a value immediately before saturation as shown in (a) in FIG. 7, and the signal potential of the pixel part becomes signal potential FDH as shown in (b) in FIG. 7. At boundary T2 serving as a transition region between middle illumination exposure and high illumination exposure in "Illumination/exposure time", the charges in storage capacitances C0 and C1 become charge Q0+Q1' that is a value immediately before saturation as shown in (a) in FIG. 7, and the signal potential of the pixel part becomes potential FDM as shown in (b) in FIG. 7. At boundary T3 within a region under highest illumination exposure in "Illumination/exposure time", the charges in storage capacitances C0, C1, and C2 become charge Q0+Q1+Q2' that is a value immediately before saturation as shown in (a) in FIG. 7, and the signal potential of the pixel part becomes potential FDL as shown in (b) in FIG. 7.

WDR synthesizing circuit 76 achieves its WDR function, i.e., expansion of the dynamic range, by synthesizing pixel signals in the low-illumination frame (under low illumination exposure), pixel signals in the middle-illumination frame (under middle illumination exposure), and pixel signals in the high-illumination frame (under high illumination exposure).

Figure 9:
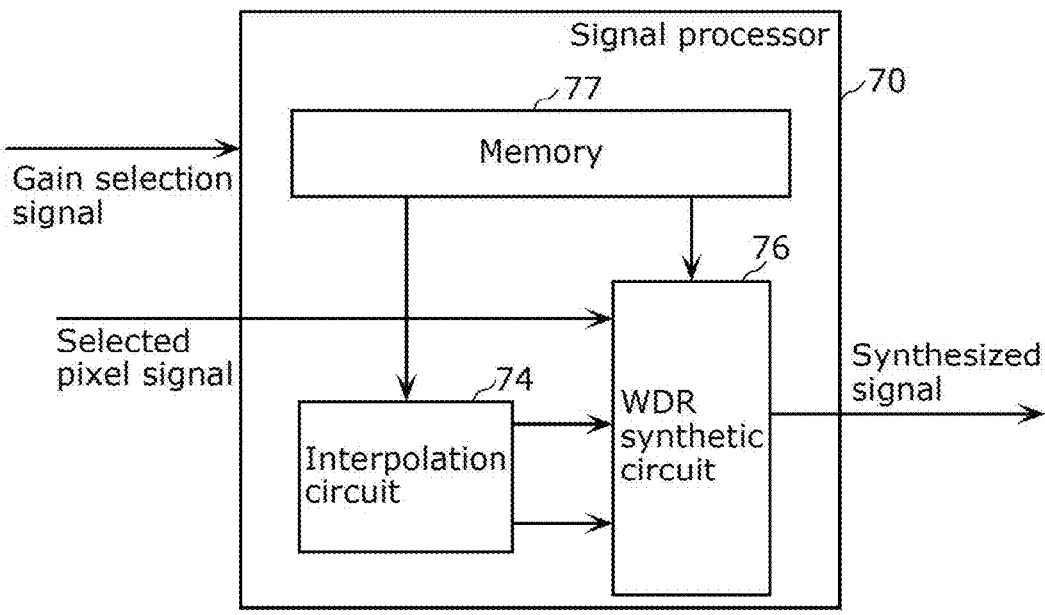
FIG. 9 is a diagram showing an exemplary configuration of a signal processor that performs WDR synthesis using two signals selected from the three signals.

FIG. 9 is a diagram showing an exemplary configuration of signal processor 70 that performs WDR synthesis using two signals selected from among the three signals. In this example, signal processor 70 includes interpolation circuit 74.

Memory 77 stores the ratio of the gains of the pixel values of the HCG signal, the MCG signal, and the LCG signal or the ratio of the sensitivity thereof corresponding to "Illumination/exposure time". The ratio of the gains or sensitivity is measured in advance and stored in memory 77. For example, memory 77 may store Gain1 and Gain2 as shown in (c) in FIG. 7. Gain1 refers to the ratio of the gains of the MCG signal and the HCG signal. Gain2 refers to the ratio of the gains of the LCG signal and the HCG signal. Note that the ratio of the gains of the LCG signal and the MCG signal may be obtained from Gain2/Gain1, or may be measured and stored in advance. If one of the values of the HCG signal, the MCG signal, and the LCG signal is identified, the other two values can be obtained by interpolation circuit 74 performing interpolation processing using the aforementioned ratios of the gains. Note that memory 77 may store the ratio of sensitivity instead of the ratio of the gains.

Interpolation circuit 74 obtains the pixel value of one pixel signal that has not been selected, by interpolation processing based on the two pixel signals selected from among the three pixel signals including the HCG signal, the MCG signal, and the LCG signal by logic circuit 4. The pixel value of the one pixel signal that has not been selected by logic circuit 4 is obtained by interpolation circuit 74 performing the interpolation processing and then input to WDR synthesizing circuit 76. The interpolation processing means interpolation or estimation.

WDR synthesizing circuit 76 linearly synthesizes the three pixel signals in accordance with the pixel signals selected by logic circuit 4 and the pixel signal obtained by the interpolation processing of interpolation circuit 74 while referencing to data on the ratio of the gains or sensitivity stored in memory 77.

For example, in the case where pixel values PH and PM of the pixel signals enclosed by alternate long and short dashed lines, i.e., the HCG signal and the MCG signal, are selected as shown in (b) in FIG. 7, the LCG signal is obtained by the interpolation processing using the ratio of the gains or sensitivity stored in memory 77.

Similarly, in the case where pixel values PM and PL of the pixel signals enclosed by alternate long and short dashed lines, i.e., the MCG signal and the LCG signal, are selected as shown in (b) in FIG. 7, the HCG signal is obtained by the interpolation processing using the ratio of the gains or sensitivity stored in memory 77.

In this way, signal processor 70 acquires two pixel signals from among pixel value PH of the HCG signal, pixel value PM of the MCG signal, and pixel value PL of the LCG signal. Signal processor 70 also acquires one of pixel value PH of the HCG signal, pixel value PM of the MCG signal, and pixel value PL of the LCG signal by interpolation performed by interpolation circuit 74. By linearly synthesizing the three pixel values acquired in this way, signal processor 70 is capable of obtaining linear digital pixel signals as shown in (c) in FIG. 7 in correspondence with a mixed charge shown in (a) in FIG. 7.

Note that it is preferable to avoid, as much as possible, the occurrence of a rapid change in the S/N ratio of a subject in the vicinity of the boundaries including boundary T1 serving as the transition region between low illumination exposure and middle illumination exposure and boundary T2 serving as the transition region between middle illumination exposure and high illumination exposure.

Figure 10:
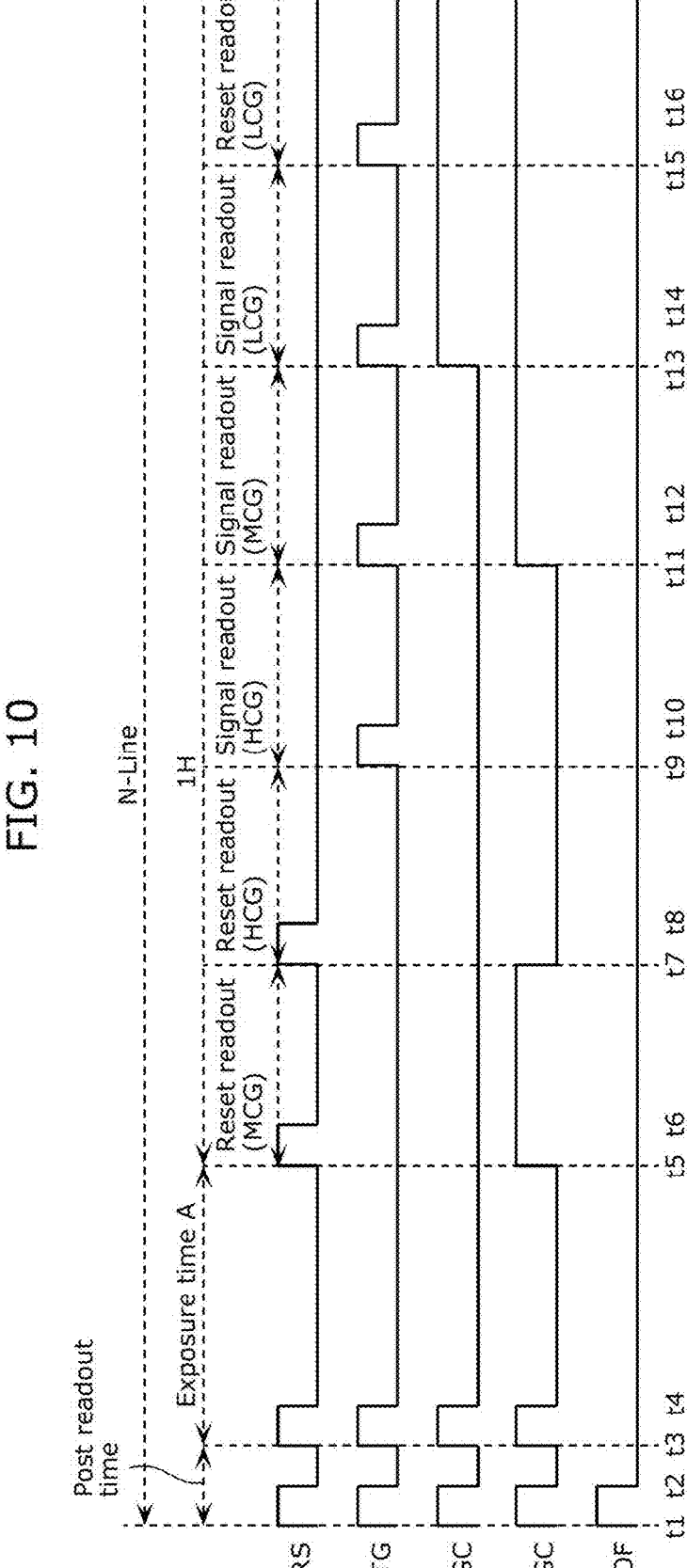
FIG. 10 is a diagram showing an example of readout timing serving as the basis of the pixel circuit.

Basic Operation of Reading Out HCG Signal, MCG Signal, and LCG Signal in WDR Synthesis FIG. 10 is a diagram showing an example of readout timing that serves as the basis of pixel circuit 3.

First, photodiode PD and charge storages FD0, FD1, and FD2 are reset from time t1 to time t2 and wait until the start of exposure. Then, a shutter operation is performed from time t3 to time t4 to start exposure. The exposure time ends at time t5.

At time t5, gain control transistor GC1 is turned on so that the signal charge stored in photodiode PD is transferred to charge storage FD1. From time t5 to time t6, a reset operation is performed. The reset component of the MCG signal is read out from time t6 to time t7.

Then, a reset operation is performed from time t7 to time t8. The reset component of the HCG signal is read out from time t8 to time t9.

Then, the signal charge stored in photodiode PD is transferred to charge storage FD0 by transfer transistor TG from time t9 to time t10. The signal component of the HCG signal is read out from time t10 to time t11.

At time t11, gain control transistor GC1 is turned on so that the signal charge stored in photodiode PD is transferred to charge storage FD1. From time t11 to t12, the signal charge stored in photodiode PD is transferred to charge storage FD1 by transfer transistor TG. The signal component of the MCG signal is read out from time t12 to time t13.

At time t13, gain control transistor TGC is turned on so that the signal charge stored in photodiode PD is transferred to charge storage FD2. From time t13 to 14, the signal charge stored in storage capacitance C2 is transferred to charge storage FD2 by gain control transistor TGC. The signal component of the LCG signal is read out from time t14 to time t15.

A reset operation is performed from time t15 to time t16. The result component of the LCG signal is readout from time t16 to time t17.

At time t16, each transistor is turned off.

In this way, the HCG signal, the MCG signal, and the LCG signal are read out.

Figure 11:
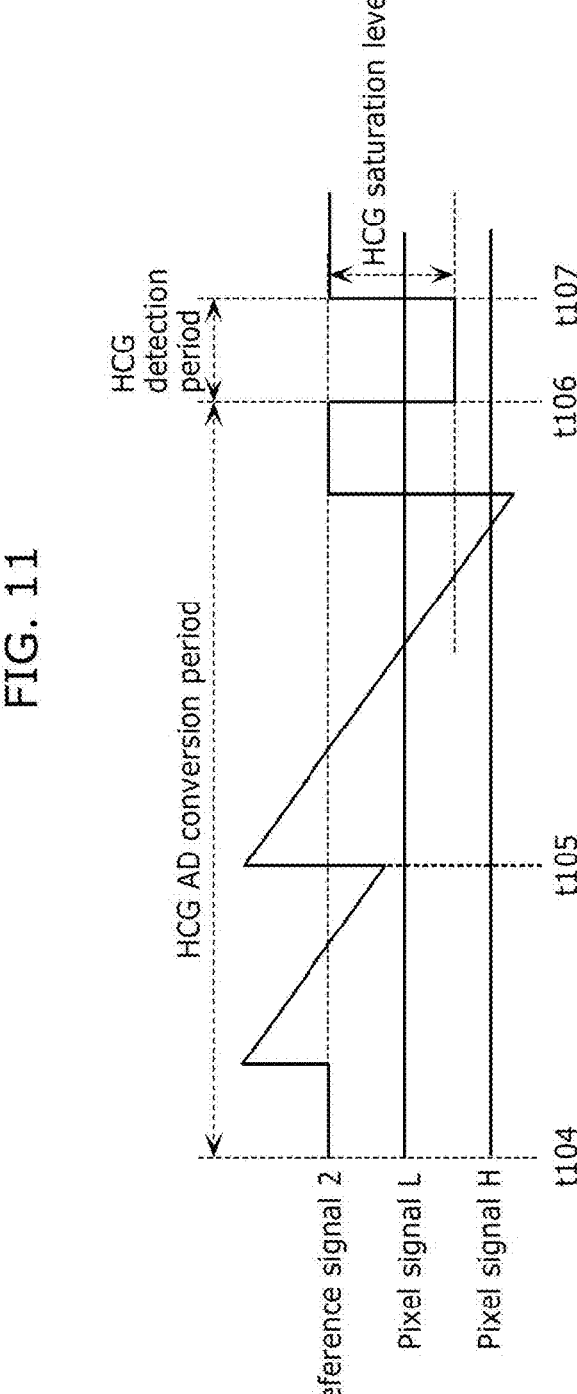
FIG. 11 is a diagram showing timing in a selection-type WDR method.

Operation of Selectively Reading Out Two Signals from HCG, MCG, and LCG Signals in WDR Synthesis FIG. 11 is a diagram showing timing in a selective WDR method. One example is described with reference to FIG. 11 in which the level of the HCG signal is detected to select two signals from among three signals including the HCG signal, the MCG signal, and the LCG signal.

In single slope-type AD conversion circuit 51, if counter circuit 512 is a binary counter, digital values are proportional to the level of the HCG signal, and therefore it is possible to select optimum two signals. However, the use of a gray code counter is more preferable in order to reduce power consumption, and in this case, digital values are not proportional to the level of the HCG signal. Thus, it is difficult to select optimum two signals.

In view of this, in the AD conversion period for the HCG signal from time t104 to time t106 shown in FIG. 11, the HCG signal is AD-converted by comparator 511 of AD conversion circuit 51 performing a comparison operation, and thereafter reference signal 2 is set to the saturation level of the HCG signal (signal potential FDH in (b) in FIG. 7) in an HCG-signal detection period from time t106 to time t107 shown in FIG. 11. During this period, reference signal 2 becomes the saturation level of the HCG signal, and becomes the HCG signal unless the pixel signal exceeds the saturation level. Accordingly, comparator 511 outputs a low level as selection signal S1 and selects the HCG signal and the MCG signal. On the other hand, the pixel signal that exceeds the saturation level (signal potential FDH) is not the HCG signal. Thus, comparator 511 outputs a high level as selection signal S1 and selects the MCG signal and the LCG signal.

Specifically, comparator 511 compares the magnitude relation between the potential of charge storage FD0 in storage capacitance C0 and the potential of reference signal 2 output from reference signal generator 272 via amplifier transistor SF1a and selector transistor SEL1 and, when the potential of charge storage FD0 in storage capacitance C0 is higher than the potential of reference signal 2, outputs low-level selection signal S1 to local pixel control circuit 61 or when this potential is lower, outputs high-level selection signal S1 to local pixel control circuit 61 so as to control pixel circuit 3.

In this way, when initialization count N is zero, pixel circuit 3 outputs three or more pixel signals, and comparator 511 compares one pixel signal (e.g., the HCG signal) that has been AD-converted among the three or more pixel signals with reference signal 2 (e.g., the saturation level of the HCG signal) and, when the one pixel signal has reached reference signal 2, generates selection signal S1 that instructs to select at least two pixel signals (e.g., the MCG signal and the LCG signal) from among the three or more pixel signals. Then, local pixel control circuit 61 selects at least two pixel signals from among the three or more pixel signals in accordance with selection signal S1.

As a result, it is possible to select two signals from among the three signals including the HCG signal, the MCG signal, and the LCG signal.

Occurrence of kTC Noise in Sample-and-Hold Circuit

When sample-and-hold circuit 30 is connected to the output of amplifier transistor SF1 (so-called voltage-domain system), kTC noise occurs during sampling of pixel signals (including both of the reset component and the signal component). At this time, it is difficult to expand the dynamic range because the S/N ratio decreases under low-illumination conditions. In order to improve kTC noise, high-density and low-leakage capacitance elements become necessary, but this is difficult to achieve during processes.

In view of this, in the WDR synthesis according to the present disclosure, the HCG signal is directly AD converted to reduce noise, and data thereon is transferred to signal processor 70. On the other hand, the MCG signal and the LCG signal whose noise characteristics are moderate are sampled and held by sample-and-hold circuit 30 and thereafter AD-converted, for which available memory 513 is used.

In this way, memory 513 is provided for only one signal among the HCG signal, the MCG signal, and the LCG signal. This suppresses degradation in noise characteristics, an increase in the area of memory 513, and a decrease in yield in the WDR synthesis.

Basic Operations in PWM Method

An example of timing in the PWM method will be described with reference to FIG. 12.

Figure 12:
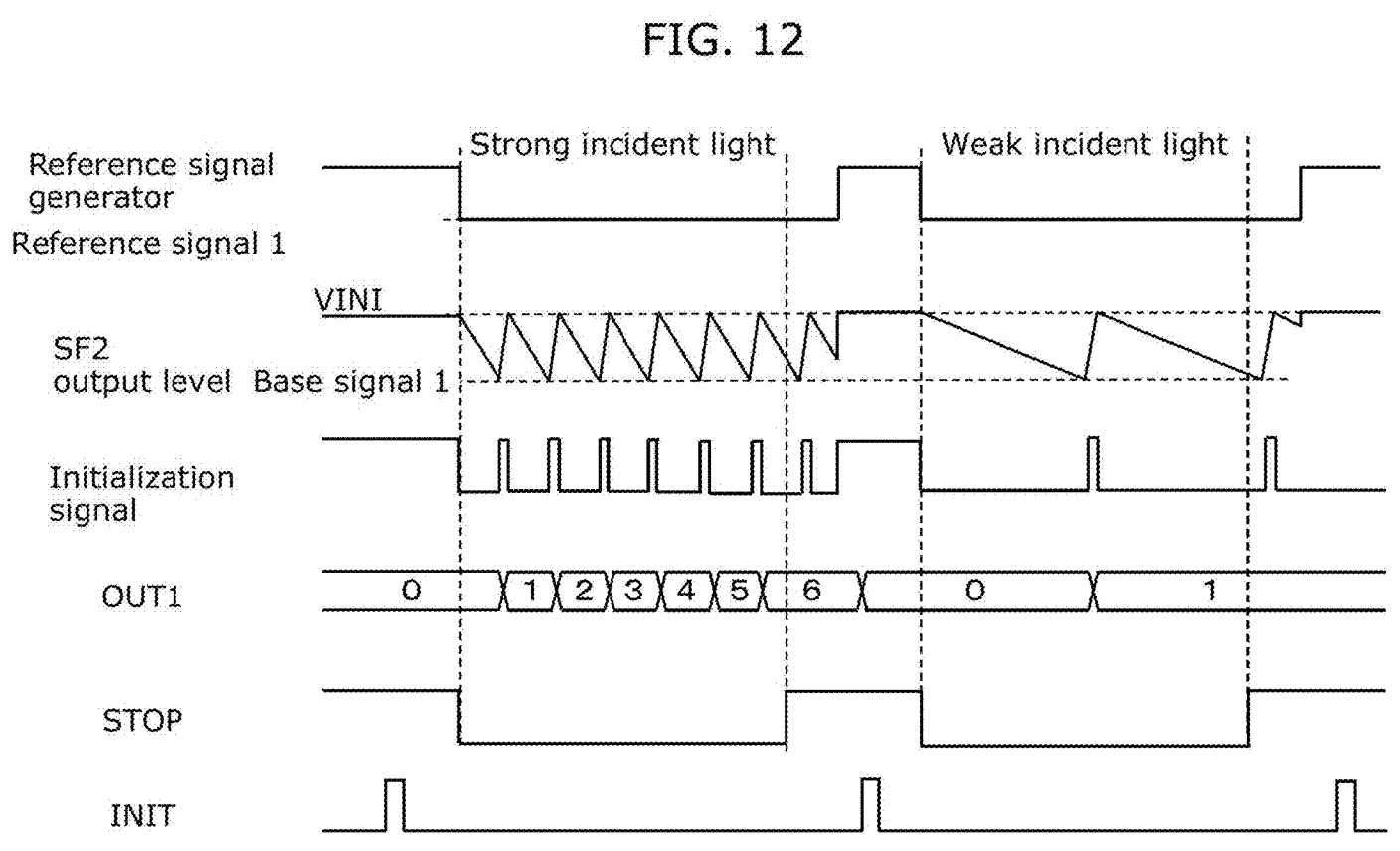

FIG. 12 is a diagram showing an example of timing that serves as the basis of the PWM method. The timing chart in FIG. 12 shows an operation of capturing two frames of images. The first frame corresponds to relatively strong incident light, and the second frame corresponds to relatively weak incident light.

Photodiode PD generates a charge by photoelectric conversion. The charge overflowing from photodiode PD is stored in storage capacitance C2 via overflow element OF, and storage capacitance C2 retains a potential that depends on the amount of the charge generated. Since the charge is generated depending on the amount of the incident light, the potential of charge storage FD2 in storage capacitance C2 drops from an initial voltage over time.

When the potential of charge storage FD2 in storage capacitance C2 has dropped to reference signal 1, local pixel control circuit 61 initializes storage capacitance C2 to the initial voltage.

Here, reference signal 1 may preferably be a voltage that is equivalent to charge Q2' stored in storage capacitance C2 shown in (a) in FIG. 7. The voltage of reference signal 1 is expressed as Q2'/C2.

For example, with the timing when the potential of charge storage FD2 in storage capacitance C2 has dropped to reference signal 1, local pixel control circuit 61 sets reset transistor RS, transfer transistor TG, gain control transistor GC1, and gain control transistor TGC to a high level and initializes photodiode PD and storage capacitance C2. The initial voltage may, for example, be a power supply voltage, or may be a voltage value determined in advance. As a result of the initialization of photodiode PD and storage capacitance C2, reset transistor RS, transfer transistor TG, and gain control transistors GC1 and TGC are brought into the OFF state by local pixel control circuit 61, and the state of initialization is cleared.

Counter circuit 522 starts a count operation from an initial value of 0. Counter circuit 522 counts the number of times local pixel control circuit 61 has initialized photodiode PD and storage capacitance C2, i.e., initialization count N, and outputs a signal corresponding to initialization count N as digital output signal OUT1, the digital output signal being a digital value that indicates N times saturation signal Qsat of the LCG signal indicating the intensity of the incident light-.

In this way, solid-state imaging device 100 outputs digital output signal OUT1 as initialization count N for each pixel cell. This enables expanding the dynamic range and allows a digital signal to be generated while initializing photodiode PD and storage capacitance C2 even if photodiode PD is irradiated with such strong light that exceeds the saturated amount of charge in storage capacitance C2. Accordingly, it is possible to capture images even in bright scenes of levels that greatly exceed the saturated amount of charge in storage capacitance C2.

PWM Method and AD Conversion Method

Figure 13:
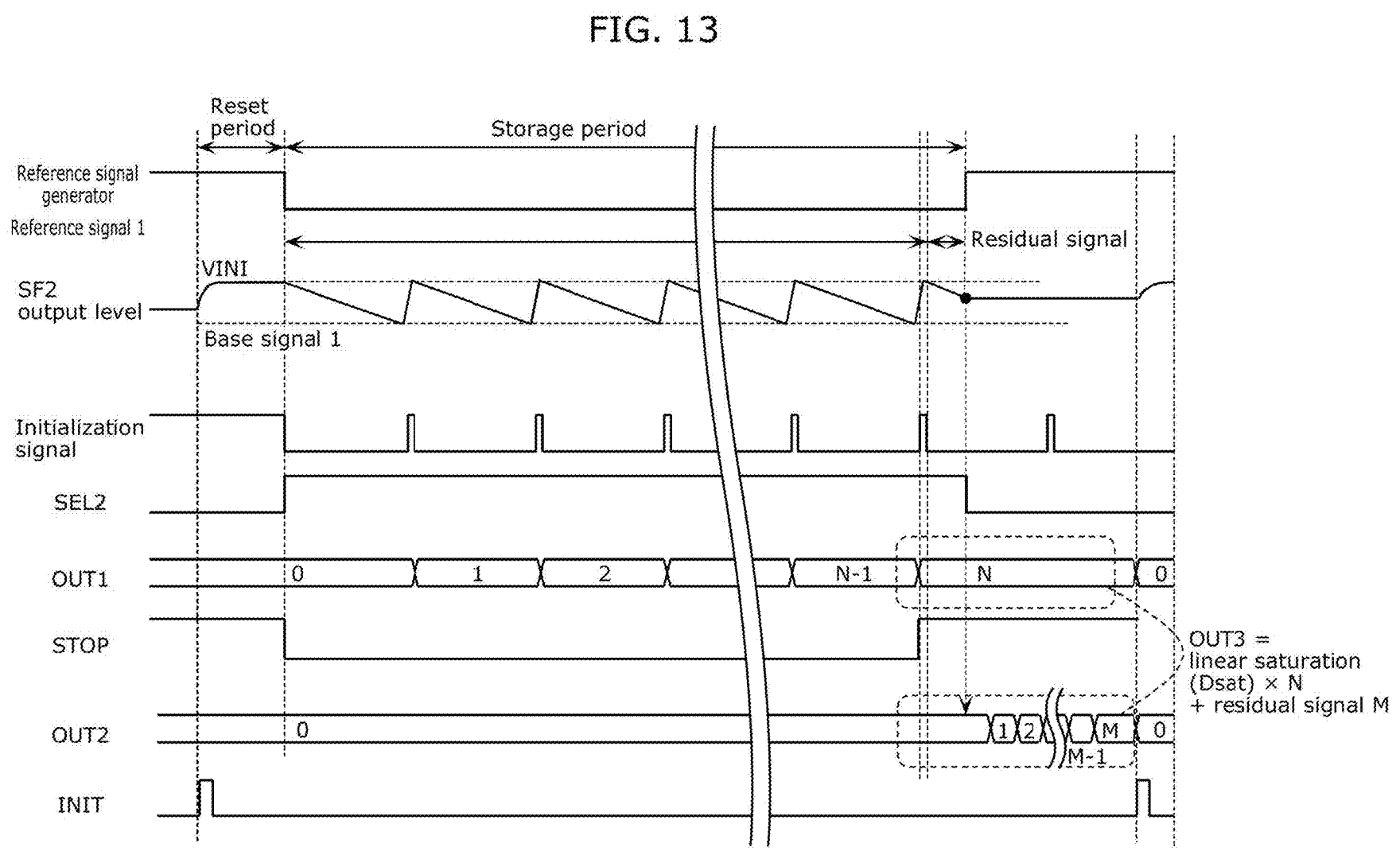

FIG. 13 is a diagram showing an example of timing when AD conversion circuit 51 is adopted into the PWM method.

Comparator 521 compares the potential of charge storage FD2 in storage capacitance C2 with reference signal 1. When the potential matches reference signal 1, local pixel control circuit 61 turns on reset transistor RS, transfer transistor TG, and gain control transistors GC1 and TGC to execute initialization.

Specifically, comparator 521 compares the magnitude relation between the potential of charge storage FD2 in storage capacitance C2 and the potential of reference signal 1 output from reference signal generator 271 via amplifier transistor SF2 and selector transistor SEL2 and, when the potential of charge storage FD2 in storage capacitance C2 is lower than the potential of reference signal 1, outputs a high-level signal as a control signal to local pixel control circuit 61, the control signal being a signal that instructs to initialize reset transistor RS, transfer transistor TG, and gain control transistors GC1 and TGC.

Initialization circuit 524 generates an initialization signal. For example, the initialization signal may be a power supply voltage, or may be any other voltage value. The initialization signal is supplied as a control signal for initializing photodiode PD and storage capacitance C2 via local pixel control circuit 61.

Reference signal generator 271 generates reference signal 1. For example, reference signal 1 may indicate the saturation level of storage capacitance C2 (the voltage value of charge storage FD2 when the charge retained in storage capacitance C2 is saturated), or may indicate a voltage value between the above voltage value of charge storage FD2 and the power supply voltage.

Here, reference signal 1 may preferably be a voltage that is equivalent to charge Q2' stored in storage capacitance C2 as shown in (a) in FIG. 7. The voltage of reference signal 1 is expressed as Q2'/C2.

Count control signal generator 80 generates count initialization signal INIT and count stop signal STOP in order to control counter circuit 522. Count initialization signal INIT is a control signal for initializing the count value of counter circuit 522 to zero. Count stop signal STOP is a signal for controlling whether to execute or stop the count operation of counter circuit 522.

When the initialization signal is at a high level, local pixel control circuit 61 turns on reset transistor RS, transfer transistor TG, and gain control transistors GC1 and TGC and initializes photodiode PD and storage capacitance C2.

When count stop signal STOP output from count control signal generator 80 is at a low level, counter circuit 522 counts initialization count N and outputs the result of counting as digital output signal OUT1, the initialization count N being the number of times the initialization signal has transitioned from the low level to the high level. When count stop signal STOP is at a high level, counter circuit 522 stops the count operation and initializes the count value to zero.

For example, if reference signal 1 is set to a power supply voltage higher than output voltage VINI of amplifier transistor SF2, it is possible to set the initialization signal to a high level and to initialize photodiode PD and storage capacitance C2. Digital output signal OUT1 is initialized to "zero" by setting count initialization signal INIT and count stop signal STOP in counter circuit 522 to a high level.

For example, if count initialization signal INIT and count stop signal STOP are set to a low level and reference signal 1 is set to a voltage lower than output voltage VINI of amplifier transistor SF2, the initialization signal is set to a low level, and initialization is stopped. The output voltage of amplifier transistor SF2 drops from output signal VINI at a speed that depends on the amount of light irradiance, and when the output voltage has reached reference signal 1, the initialization signal transitions to a high level, digital output signal OUT1 becomes "1", photodiode PD and storage capacitance C2 are initialized, the output voltage of amplifier transistor SF2 becomes output signal VINI, and the initialization signal becomes at a low level.

Also, the output voltage of amplifier transistor SF2 drops from output signal VINI at a speed that depends on the amount of light irradiance, and when the output voltage has reached reference signal 1, the initialization signal transitions to a high level, digital output signal OUT1 becomes "2", photodiode PD and storage capacitance C2 are initialized, the output voltage of amplifier transistor SF2 becomes output signal VINI, and the initialization signal becomes at a low level.

This operation continues to be executed until the end of the exposure time, so that digital output signal OUT1 increases until the end of the exposure time. Here, digital output signal OUT1 at the end of the exposure time corresponds to initialization count N.

When count stop signal STOP becomes at a high level, counter circuit 522 continues to retain the count value at that time and generates digital output signal OUT1 of a digital signal that depends on the amount of light with which photodiode PD is irradiated for each pixel cell.

When a fixed amount of charge has been accumulated in storage capacitance C2, solid-state imaging device 100 resets the charge in storage capacitance C2 and outputs a reset count as a digital value. By generating a digital signal for each pixel cell, solid-state imaging device 100 is capable of high-speed imaging. Moreover, even in such a state that photodiode PD is irradiated with such strong light that even disables a photoelectric conversion in storage capacitance C2, solid-state imaging device 100 generates digital signals while initializing photodiode PD and storage capacitance C2. This allows image capture even in such bright scenes that greatly exceed the saturated amount of charges in photodiode PD and storage capacitance C2.

Besides, imaging associated with initialization is possible even if photodiode PD and storage capacitance C2 have smaller light-receiving regions. Accordingly, it is possible to achieve a reduction in the size and cost of solid-state imaging device 100.

Next, an exemplary operation of AD conversion circuit 51 will be described with reference to FIG. 13.

AD conversion circuit 51 converts a high-illumination pixel signal (LCG signal) and a residual signal obtained by FD mixing of the signal of photodiode PD and the signal of storage capacitance C2 after last initialization from analog to digital, and outputs the AD-converted data as digital output signal OUT2 that indicates the intensity of the incident light.

Specifically, AD conversion circuit 51 outputs digital output signal OUT2 that depends on saturation signal Qsat and the potential obtained by FD mixing of the potential of photodiode PD and the potential of storage capacitance C2 after counter circuit 512 has stopped counting.

Signal processor 70 synthesizes digital output signal OUT1 and digital output signal OUT2 to generate digital output signal OUT3 (i.e., the first signal) that indicates the intensity of the incident light.

In the example shown in FIG. 13, N represents digital output signal OUT1 of counter circuit 522, and M represents digital output signal OUT2 of counter circuit 512. Digital value Dsat represents the digital value of saturation signal Qsat obtained by FD mixing of the signal of photodiode PD and the signal of storage capacitance C2. At this time, in signal processor 70, total digital output signal OUT3 is expressed as "Dsat×N+M".

Solid-state imaging device 100 converts the residual signal from analog to digital and outputs the converted signal together with initialization count N in digital form. This enables outputting a higher-precision digital signal in accordance with the amount of light irradiance and achieving excellent imaging that reproduces luminance and hue closer to those in the outside world.

Signal Selection in Unit of Color Filter Array

The selection of signals in a unit of color filter array will be described using typical four colors (R, Gr, B, and Gb) in the Bayer array as an example.

Here, the relation of the color filter, boundary T1 between the HCG signal and the MCG signal, and boundary T2 between the MCG signal and the LCG signal will be described with reference to FIG. 7.

In general, boundaries T1 and T2 serving as the transition regions change in response to analog or digital gains.

For example, in the case of the Bayer array, sensitivity differs among the four colors (R, Gr, B, and Gb), with Gr and Gb showing highest sensitivity and B and R showing lower sensitivity. Thus, boundaries T1 and T2 of Gr and Gb are lower than those of B and R. In response to this, the voltage level changes at boundaries T1 and T2 of each color.

There are two methods for the WDR synthesis. These methods will be described with reference to FIGS. 14 and 15.

Figures 14, 15, 16:
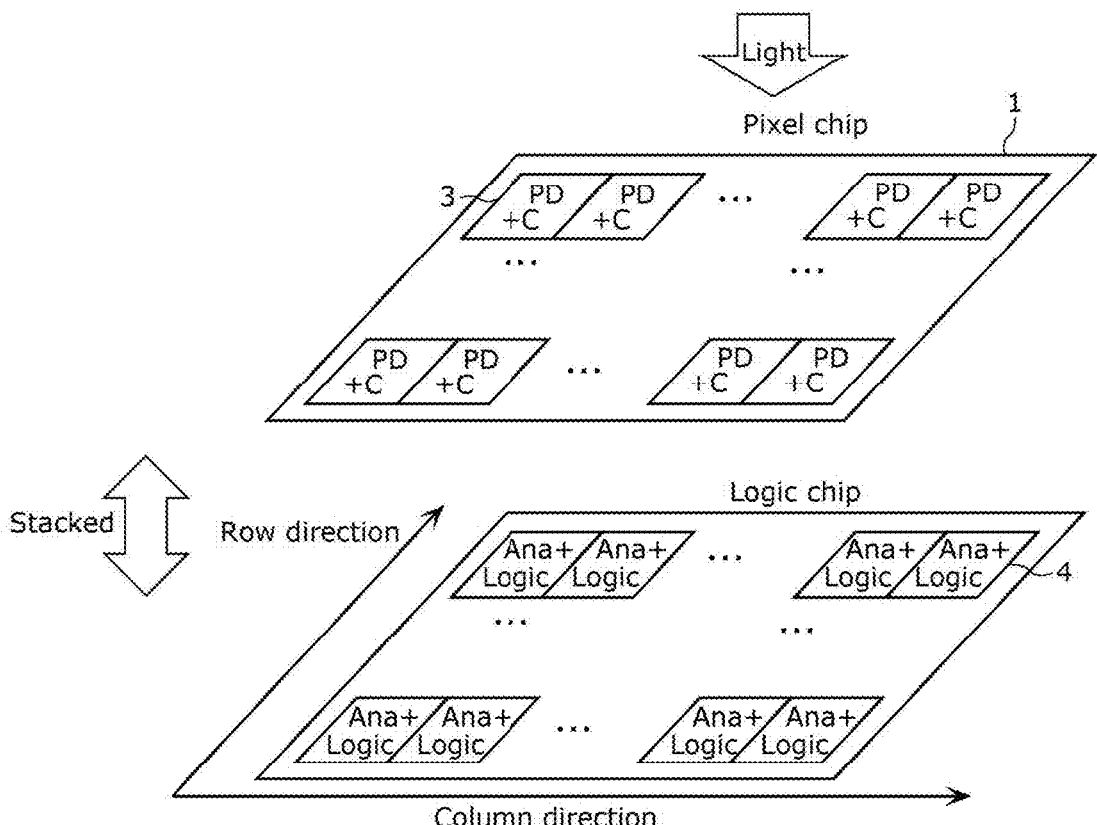
FIG. 14 is a diagram for describing an example of selecting an HCG signal, an MCG signal, and an LCG signal with higher priority given to the maximum signal of each color in the Bayer unit.
FIG. 15 is a diagram for describing an example of selecting the HCG signal, the MCG signal, and the LCG signal independently for each color.
FIG. 16 is a diagram showing an example in which the solid-state imaging device according to the embodiment is configured as a stacked image sensor.

FIG. 14 is a diagram for describing an example in which the selection of the HCG signal, the MCG signal, and the LCG signal is made with higher priority given to the maximum signal of each color in the Bayer unit.

In the case of the Bayer array, the first method is a synthesis method for synthesizing three frame by using the gains of the maximum signals of the four colors (R, Gr, B, and Gb) indicated by bold frames in FIG. 14.

In this case, the signal levels of the four colors (R, G, B, and Gb) are adjusted to the signal level of color with the maximum signal level among the four colors. For example, if it is detected that Gr is the color with the maximum signal level and detected as the LCG signal, the signals of the other three colors (R, B, and Gb) are also detected as the LCG signals. For example, if it is detected that R is the color with the maximum signal level and detected as the MCG signal, the signals of the other three colors (Gr, B, and Gb) are also detected as the MCG signals.

In this way, pixel circuits 3 correspond to pixels in the color filter array, and local pixel control circuit 62 may perform the same pixel control on pixel circuits 3 in accordance with the maximum signal level of the pixels in the color filter array.

Accordingly, the gains are the same in the unit of color filter array, e.g., in the unit of the Bayer array consisting of four colors, and therefore it is possible to prevent the occurrence of coloring due to a deviation in linearly of each color that may be caused when the gain differs for each color. Besides, even if the gain varies for each color under autoexposure (AE) control, it is possible to change boundaries T1 and T2 serving as the transition regions in conjunction with each other by always using the maximum signal level of the four colors (R, Gr, B, and Gb) in the SN level shown in (d) in FIG. 7. Since the gains of each color (the HCG signal, the MCG signal, and the LCG signal) are the same before and after the boundary portions serving as the transition regions in the WDR, there is no coloring caused by a deviation in linearity of each color.

FIG. 15 is a diagram for describing an example in which the HCG signal, the MCG signal, and the LCG signal are selected independently for each color.

In the case of the Bayer array, the second method is a synthesis method for individually synthesizing three frames by using individual gains of respective signals of the four colors (R, Gr, B, and Gb) shown in FIG. 15. Even if the gain varies for each color due to an AE operation, boundaries T1 and T2 serving as the transition regions of the four colors (R, Gr, B, and Gb) are always changed independently in the S/N level shown in (d) in FIG. 7. In this case, the HCG signal, the MCG signal, or the LCG signal is selected in accordance with the signal level of each color.

In particular, for example, even if the analog or digital gain varies for each color under AE control when the gain is adjusted for each color with a change in white balance resulting from a change in the color temperature of a subject, it is possible to synthesize the WDR of each frame.

This brings about the effect of improving the S/N ratio because boundaries T1 and T2 for each color can be maximized in the WDR synthesis.

Example of Stacked BSI Configurations of Pixel Circuit and Detection Circuit

The next description is about an example of a stacked back-side-illumination (BSI) configuration of pixel circuit 3 and logic circuit 4.

FIGS. 16 to 19 are diagrams showing examples in which solid-state imaging device 100 according to the embodiment is configured as a stacked image sensor.

Solid-state imaging device 100 shown in each drawing (FIGS. 16 to 19) includes a first semiconductor chip (first semiconductor substrate) and a second semiconductor chip (second semiconductor substrate) that are bonded together, or includes three or more semiconductor chips bonded together. The semiconductor chips are one example of semiconductor substrates. The first semiconductor chip and the second semiconductor chip are bonded to each other on their surfaces on the side of a wiring layer. In each drawing, PD represents photodiode PD, C represents the sample-and-hold capacitance (e.g., capacitance elements CR and CS), Ana represents the analog circuit (e.g., comparators 511 and 521), Logic represents the logic circuit (e.g., counter circuits 512 and 522), and MEM represents the memory circuit (e.g., memory 513 and memory 523).

Pixel circuit 3 is formed on the first semiconductor substrate configured by one or a plurality of semiconductor layers, detection circuit 52 is formed on the second semiconductor substrate configured by one or a plurality of semiconductor layers, and the first and second semiconductor substrates are layered one above the other. AD conversion circuit 51 is formed on the second semiconductor substrate. Selection circuits SW1 and SW2 are formed on the first semiconductor substrate or the second semiconductor substrate.

The first semiconductor chip is described as a pixel chip in each drawing and includes a principal part of solid-state imaging device 100 serving as a back-side irradiation CMOS image sensor. The first semiconductor chip includes photodiode PD and storage capacitance C2 of each pixel circuit 3.

The second semiconductor chip is described as a logic chip in each drawing (logic chips A and B in FIG. 18) and includes detection circuit 52 and AD conversion circuit 51. For example, the second semiconductor chip may include main analog circuits (e.g., comparators 511 and 521) and logic circuits (e.g., counter circuits 512 and 522) such as signal processor 70.

In solid-state imaging device 100, each pixel circuit 3 can be mounted as a stacked BSI contact image sensor (CIS) on the pixel chip, and logic circuit 4 can be mounted on the logic chip. That is, photodiode PD can be mounted for each pixel circuit 3 on the pixel chip, and logic circuit 4 can be configured on the logic chip. Then, pixel signals can be directly read out to logic circuit 4. This allows the logic chip to be configured by only analog circuits and logic circuits, thereby facilitating integration and reducing layout area. Moreover, logic circuit 4 is capable of selecting at least two optimum signals from among a plurality of pixel signals received from pixel array 1. This reduces the number of bits in memory 513 and the number of bits in memory 523 in logic circuit 4 and reduces the area of logic circuit 4. This also allows memory 513, memory 523, and signal processor 70 to achieve a speedup and a reduction in power consumption.

Figure 20:
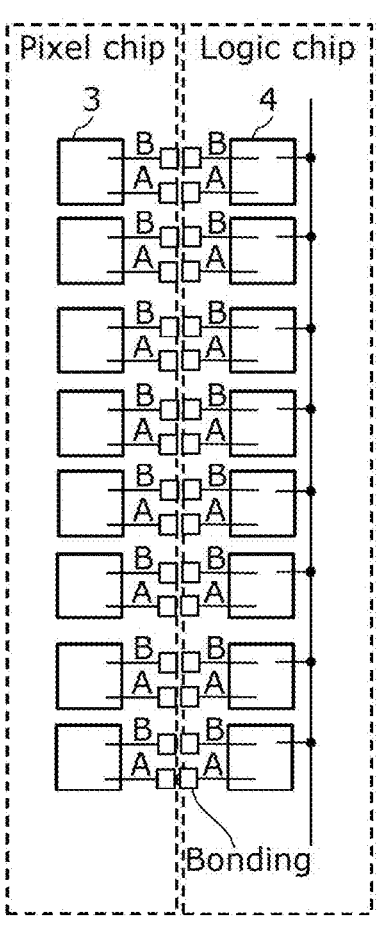
FIG. 20 is a diagram showing an example of bonding of the pixel circuit and the logic circuit according to the embodiment.
Figure 21:
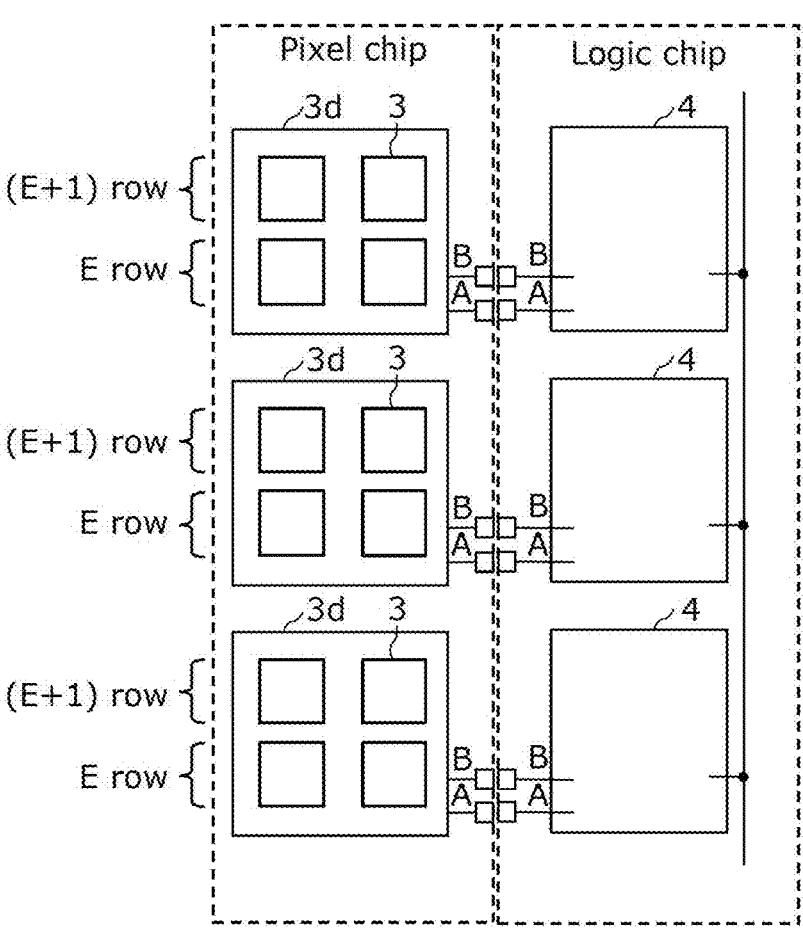
FIG. 21 is a diagram showing another example of bonding of the pixel circuit and the logic circuit according to the embodiment.

FIGS. 20 and 21 are diagrams showing examples of bonding between pixel circuit 3 and logic circuit 4 according to the embodiment.

The pixel chip and the logic chip may have joints A and B shown in FIGS. 20 and 21. FIG. 20 corresponds to FIGS. 2 to 4, and FIG. 21 corresponds to FIG. 5.

In the example shown in FIG. 16, a capacitance element of sample-and-hold circuit 30 is mounted for each pixel circuit 3 on the pixel chip, and logic circuits 4 are mounted on the logic chip. The capacitance elements of sample-and-hold circuit 30 configured on the pixel chip yields excellent noise resistance against wrap-around of digital signals. The logic chip configured by only analog circuits and logic circuits facilitates integration and reduces layout area. Since logic circuit 4 reduces the number of pixel signals by selecting at least two optimum signals from among a plurality of pixel signals received from pixel array 1, it is possible to reduce time and electric power required to transfer digital signals to signal processor 70 and thereby to achieve a speedup and a reduction in power consumption.

Figure 17:
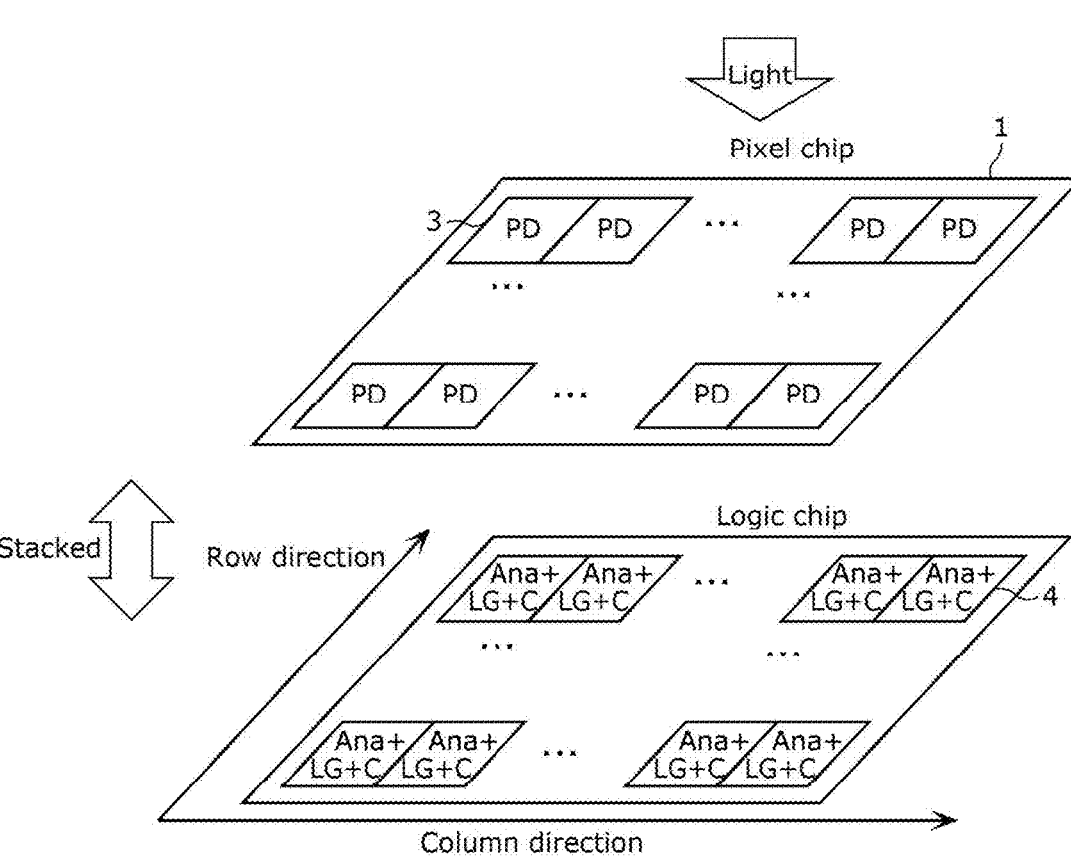
FIG. 17 is a diagram showing another example in which the solid-state imaging device according to the embodiment is configured as a stacked image sensor.

In the example shown in FIG. 17, each pixel is mounted on the pixel chip, and a capacitance element of sample-and-hold circuit 30 is mounted for each pixel circuit 3 on the logic chip. Logic circuits 4 are mounted on the logic chip. The capacitance elements of sample-and-hold circuit 30 configured on the logic chip achieves excellent parasitic sensitivity. If there are constraints on spaces occupied by components, the capacitance elements of sample-and-hold circuit 30 may be divided and mounted on both of the pixel chip and the logic chip. In the example shown in FIG. 17, it is also possible to achieve a speedup and a reduction in power consumption as in the example shown in FIG. 16.

Figure 18:
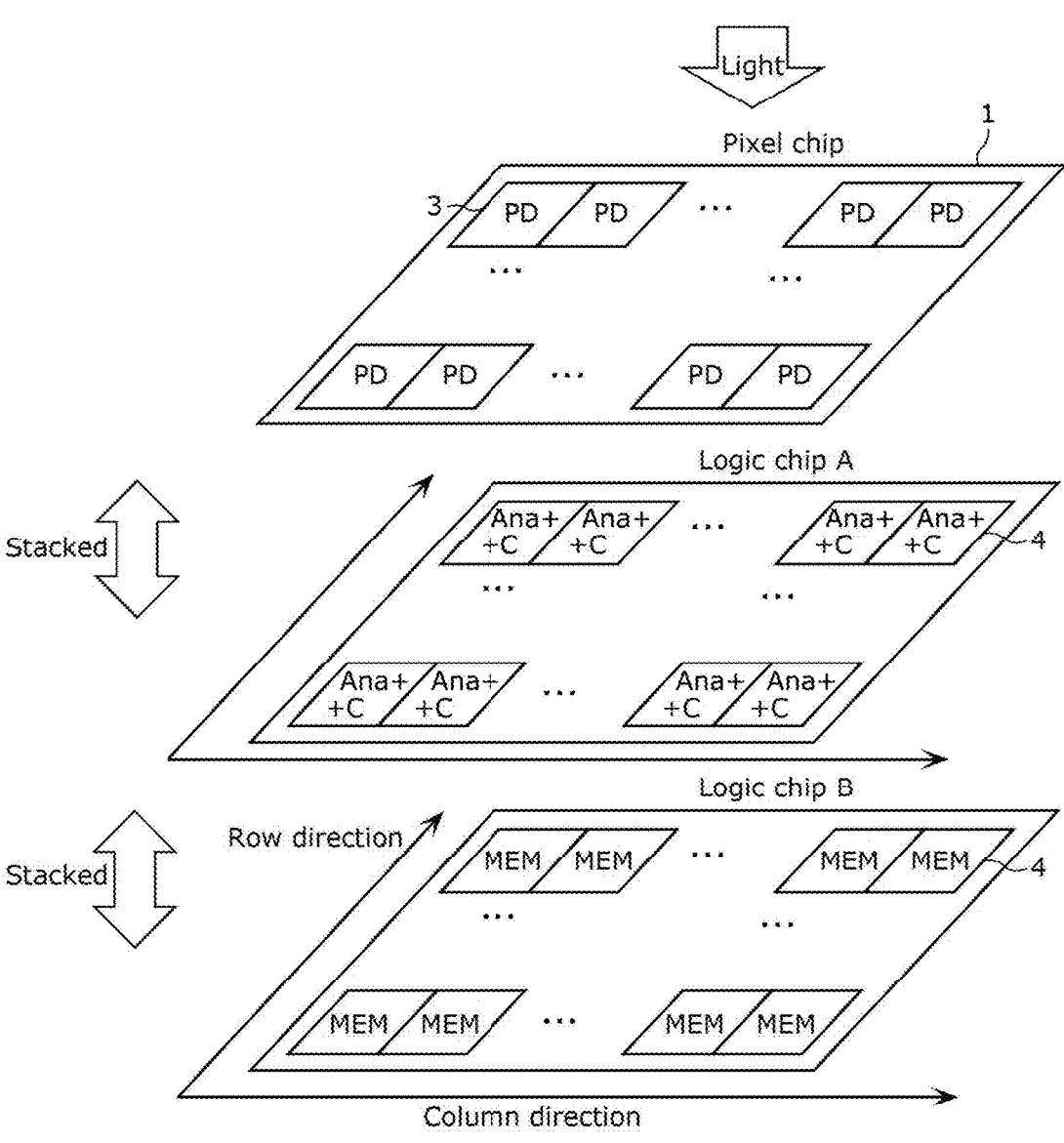
FIG. 18 is a diagram showing another example in which the solid-state imaging device according to the embodiment is configured as a stacked image sensor.

In the example shown in FIG. 18, each pixel is mounted on the pixel chip, a capacitance element of sample-and-hold circuit 30 is mounted for each pixel circuit 3 on logic chip A, and memory is mounted on logic chip B in correspondence with each pixel circuit 3. Each memory configured on logic chip B speedups the output of an output signal from the memory. In the example shown in FIG. 18, it is also possible to achieve a speedup and a reduction in power consumption as in the example shown in FIG. 16.

Figure 19:
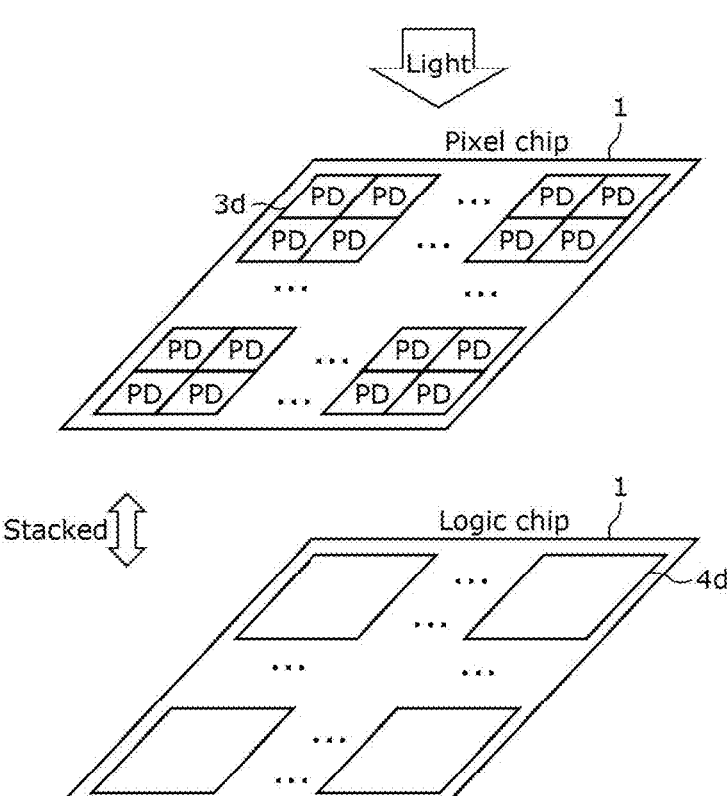
FIG. 19 is a diagram showing another example in which the solid-state imaging device according to the embodiment is configured as a stacked image sensor.

In the example shown in FIG. 19, the capacitance elements of sample-and-hold circuit 30 are mounted for each pixel circuit 3 on the pixel chip, and logic circuit 4d is mounted on the logic chip. The capacitance elements of sample-and-hold circuit 30 configured on the pixel chip achieve excellent noise resistance against wrap-around of digital signals. A plurality of pixel circuits 3 that configure each pixel circuit group 3d share logic circuit 4d. This allows the logic chip to be configured by only analog circuits and logic circuits, thereby facilitating integration and reducing layout area. In the example shown in FIG. 19, it is also possible to achieve a speedup and a reduction in power consumption as in the example shown in FIG. 16.

Specific Example Operations

Next, more specific example operations of solid-state imaging device 100 using the PWM method and the selective WDR method will be described with reference to FIGS. 22 to 24.

Figure 22:
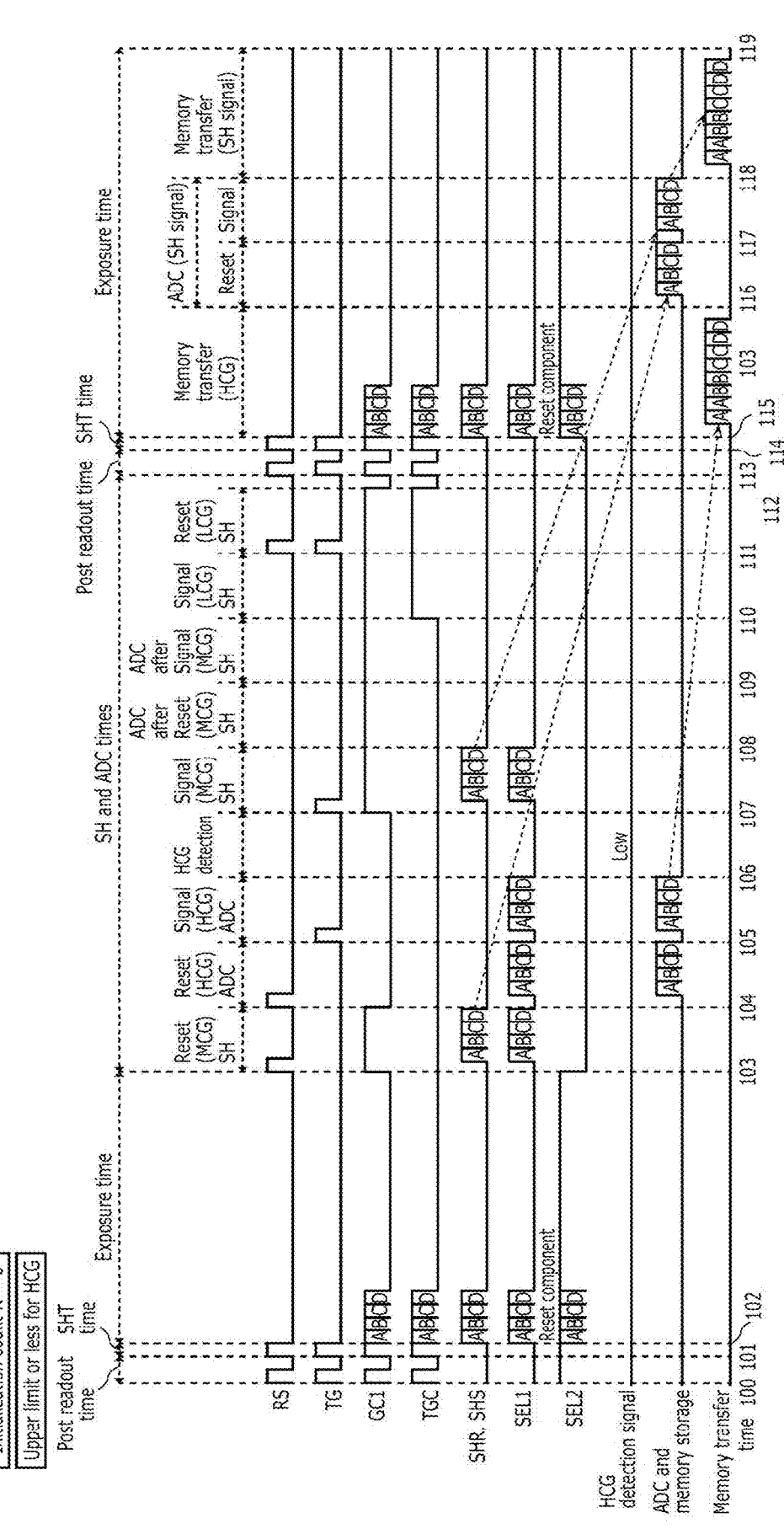
FIG. 22 is a diagram showing an example of timing when the HCG signal and the MCG signal are selected.

FIG. 22 is a diagram showing an example of timing in the case of selecting the HCG signal and the MCG signal.

Figure 23:
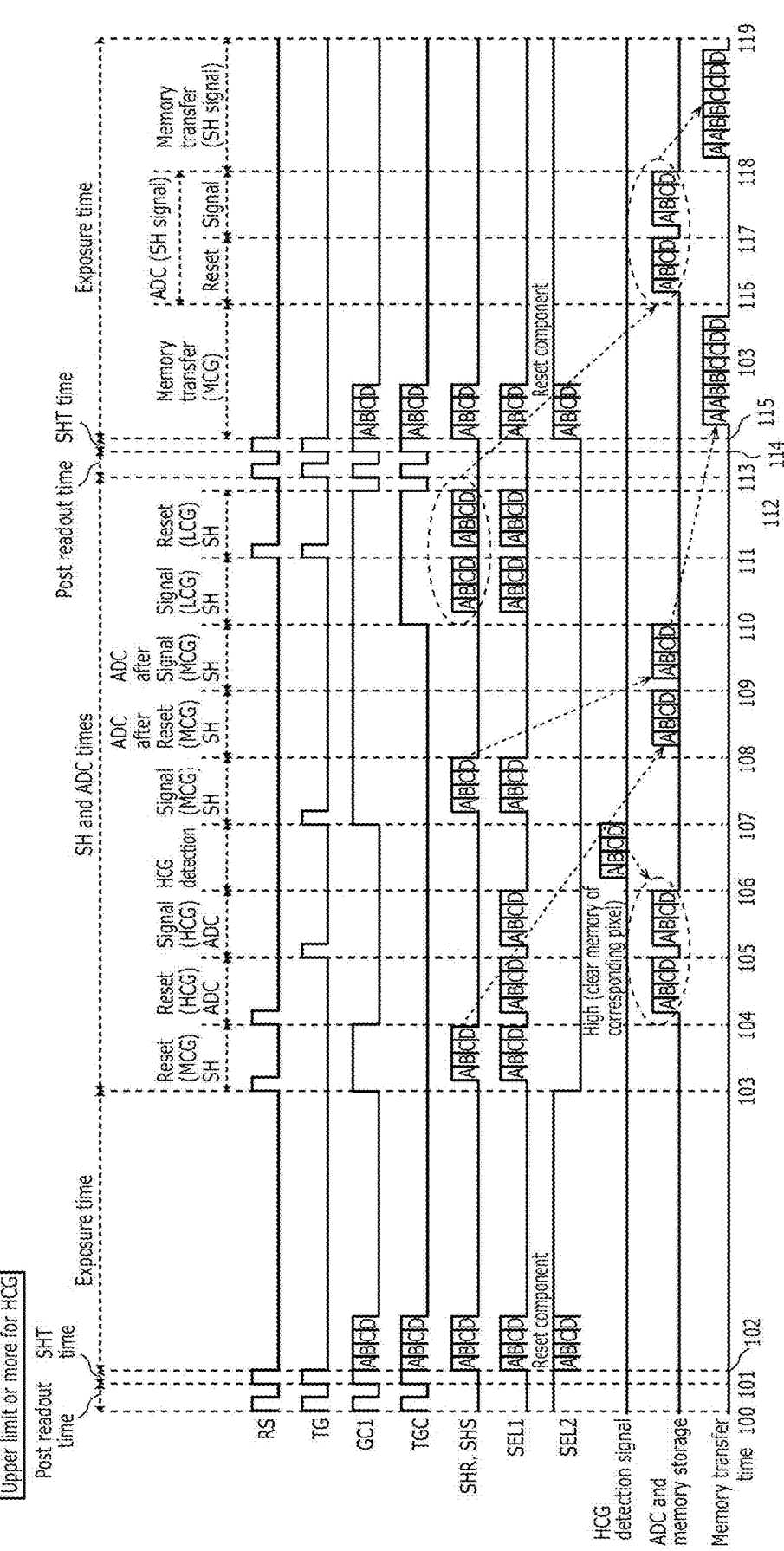
FIG. 23 is a diagram showing an example of timing when the MCG signal and the LCG signal are selected.

FIG. 23 is a diagram showing an example of timing in the case of selecting the MCG signal and the LCG signal.

Figure 24:
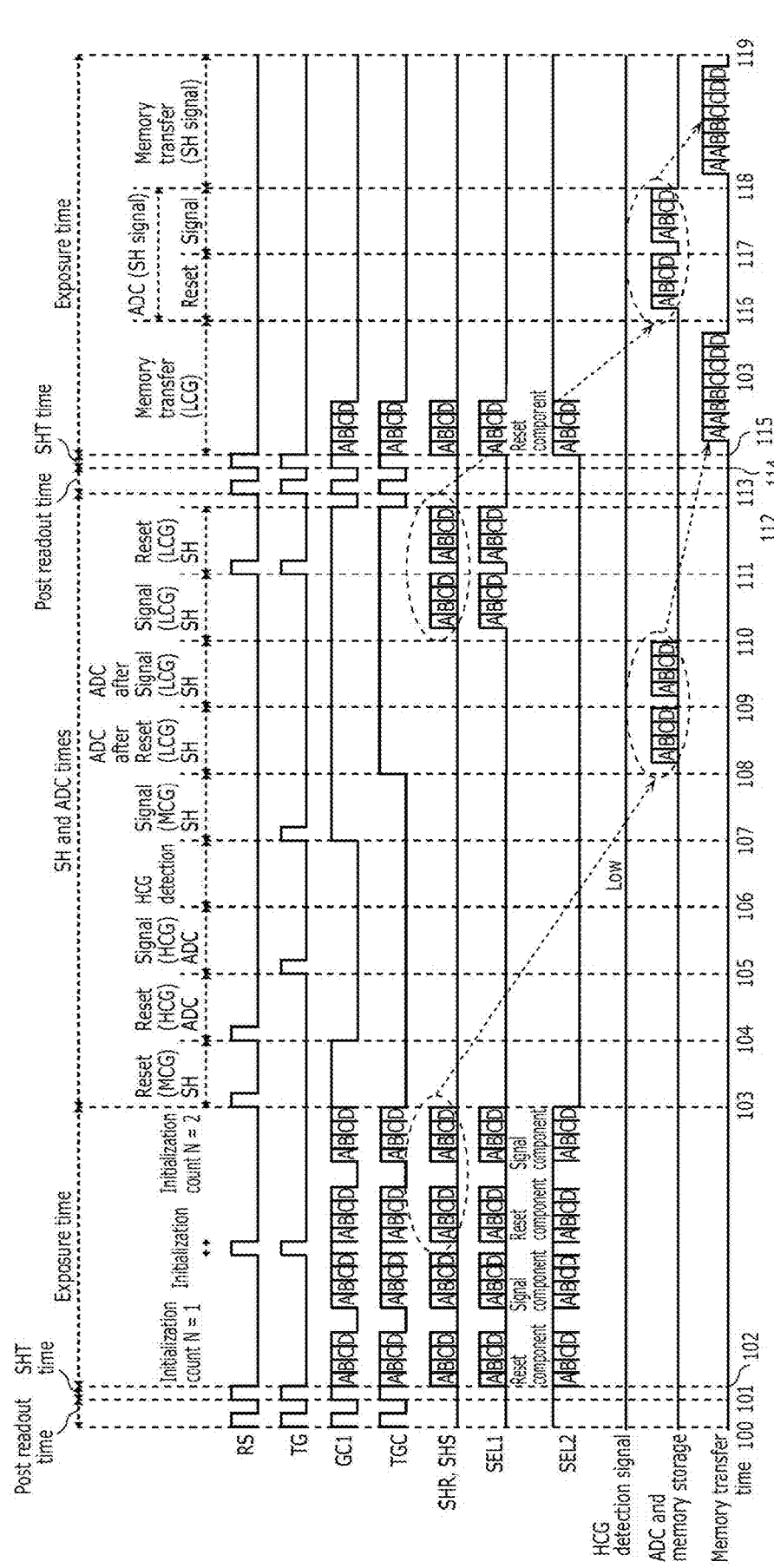
FIG. 24 is a diagram showing an example of timing when a residual signal a saturation level of the LCG signal are selected.

FIG. 24 is a diagram showing an example of timing in the case of selecting the saturation level of the LCG signal and the residual signal.

FIGS. 22 to 24 show example of timing for selective WDR using the selective readout operation shown in FIG. 11 when pixel circuits 3 (pixel circuits A to D) shown in FIG. 5 share logic circuit 4d. Note that, by focusing on one pixel circuit 3 among pixel circuits A to D, the following description is also applicable even to the case where logic circuit 4 is provided for every single pixel circuit 3 as shown in FIGS. 2A to 4.

The following description is given on the assumption that initialization count N becomes zero when the illumination of the incident light ranges from low illumination to middle illumination, and initialization count N becomes one or more when the incident light has high illumination.

First, one case is described with reference to FIG. 22, in which the level of the HCG signal does not exceed reference signal 2 (the saturation level of the HCG signal) when the incident light has low illumination. At this time, two signals including the HCG signal and the MCG signal are selected and synthesized by WDR synthesizing circuit 76 of signal processor 70. The LCG signal is unnecessary.

From time 102 to time 103, due to low illumination, the charge in photodiode PD does not exceed a predetermined threshold value of overflow element OF during exposure. Thus, there is no charge accumulated in storage capacitance C2, and detection circuit 52 does not operate. First, after a shutter (SHT) time, gain control transistors GC1 and TGC are turned on so that the reset component of the LCG signal is sampled and held in capacitance element CR of sample-and-hold circuit 30 in accordance with sample-and-hold signal SHR. However, the sampled and held charge is discharged because storage capacitance C2 does not exceed the saturation level and detection circuit 52 does not operate during exposure.

From time 103 to time 104, gain control transistor GC1 is turned on so that the reset component of the MCG signal is sampled and held in capacitance element CR of sample-and-hold circuit 30 in accordance with sample-and-hold signal SHR.

From time 104 to time 106, the reset component and signal component of the HCG signal are AD-converted and stored in memory 513.

In the description of FIG. 22, it is assumed that, from time 106 to time 107, the level of the HCG signal does not exceed the saturation level (signal potential FDH) during the selective readout operation in FIG. 11. A case where the level of the HCG signal exceeds the saturation level will be described later with reference to FIG. 23.

From time 107 to time 108, gain control transistor GC1 is turned on so that the signal component of the MCG signal is sampled and held in capacitance element CS of sample-and-hold circuit 30 in accordance with sample-and-hold signal SHS.

From time 108 to time 110, no AD conversion is carried out on the reset component and signal component of the MCG signal that have been sampled and held. This is because memory 513 has already stored data on the HCG signal.

From time 110 to time 112, no readout is carried out on the reset component and signal component of the LCG signal. This is because WDR synthesis can be conducted using the two signals: the HCG signal and the MCG signal.

From time 115 to time 116, the data on the HCG signal stored in memory 513 is transferred to signal processor 70 during the next exposure.

From time 116 to time 118, the reset component of the MCG signal, which has been sampled and held in capacitance element CR of sample-and-hold circuit 30 in accordance with sample-and-hold signal SHR, and the signal component of the MCG signal, which has been sampled and held in capacitance element CS of sample-and-hold circuit 30 in accordance with sample-and-hold signal SHS, are AD-converted and stored in memory 513 that has become empty from time 115 to time 116.

From time 118 to time 119, the data on the MCG signal stored in memory 513 is transferred to signal processor 70 during exposure.

Next, another case will be described with reference to FIG. 23 in which the level of the HCG signal exceeds reference signal 2 (the saturation level of the HCG signal) when the incident light has middle illumination. At this time, two signals including the MCG signal and the LCG signal are selected and synthesized by WDR synthesizing circuit 76 of signal processor 70. The HCG signal is unnecessary.

From time 102 to time 103, due to middle illumination, the charge in photodiode PD exceeds a predetermined threshold value of overflow element OF during exposure. Thus, a charge is accumulated in storage capacitance C2 but does not reach the saturation level, and detection circuit 52 does not operate. First, after a shutter (SHT) time, gain control transistors GC1 and TGC are turned on so that the reset component of the LCG signal is sampled and held in capacitance element CR of sample-and-hold circuit 30 in accordance with sample-and-hold signal SHR. However, the sampled and held charge is discharged because storage capacitance C2 does not exceed the saturation level and detection circuit 52 does not operate during exposure.

From time 103 to time 104, gain control transistor GC1 is turned on so that the reset component of the MCG signal is sampled and held in capacitance element CR of sample-and-hold circuit 30 in accordance with sample-and-hold signal SHR.

From time 104 to time 106, the reset component and signal component of the HCG signal are AD-converted and stored in memory 513.

In the description of FIG. 23, it is assumed that, from time 106 to time 107, the level of the HCG signal exceeds the saturation level (signal potential FDH) during the selective readout operation in FIG. 11. The case where the level of the HCG signal does not exceed the saturation level is as described with reference to FIG. 22.

From time 107 to time 108, gain control transistor GC1 is turned on so that the signal component of the MCG signal is sampled and held in capacitance element CS of sample-and-hold circuit 30 in accordance with sample-and-hold signal SHS.

From time 108 to time 110, the reset component and signal component of the MCG signal that have been sampled and held are AD-converted and stored in memory 513. At this time, the data on the HCG signal stored in memory 513 has been cleared, and memory 513 has become empty from time 106 to time 107.

From time 110 to time 112, the reset component and signal component of the LCG signal are respectively sampled and held in capacitance elements CR and CS of sample-and-hold circuit 30 in accordance with sample-and-hold signals SHR and SHS.

From time 115 to time 116, the data on the MCG signal stored in memory 513 is transferred to signal processor 70 during the next exposure.

From time 116 to time 118, the reset component of the LCG signal, which has been sampled and held in capacitance element CR of sample-and-hold circuit 30 in accordance with sample-and-hold signal SHR, and the signal component of the LCG signal, which has been sampled and held in capacitance element CS of sample-and-hold circuit 30 in accordance with sample-and-hold signal SHS, are AD-converted and stored in memory 513 that has become empty from time 115 to time 116.

From time 118 to time 119, the data on the LCG signal stored in memory 513 is transferred to signal processor 70 during exposure.

Next, yet another example will be described with reference to FIG. 24 in which initialization count N is one or more when the incident light has high illumination. At this time, two signals including saturation signal Qsat of the LCG signal and the residual signal of the LCG signal are selected and synchronized by WDR synthesizing circuit 76 of signal processor 70. The HCG signal and the MCG signal are unnecessary.

From time 102 to time 103, due to high illumination, the charge in photodiode PD exceeds a predetermined threshold value of overflow element OF during exposure. Thus, a charge is accumulated in storage capacitance C2, storage capacitance C2 exceeds the saturation level, and detection circuit 52 operates. FIG. 24 shows an example in which initialization count N is two. First, after a shutter (SHT) time, gain control transistors GC1 and TGC are turned on so that the reset component of the LCG signal is sampled and held in capacitance element CR of sample-and-hold circuit 30 in accordance with sample-and-hold signal SHR. Then, storage capacitance C2 exceeds the saturation level, and the detection circuit 52 operates. Then, the charges in photodiode PD and storage capacitance C2 are subjected to FD mixing so that the signal component of the saturation level (saturation signal Qsat) of the LCG signal is sampled and held in capacitance element CS of sample-and-hold circuit 30 in accordance with sample-and-hold signal SHS.

After initialization, gain control transistors GC1 and TGC are turned on so that the reset component of the LCG signal is sampled and held in capacitance element CR of sample-and-hold circuit 30 in accordance with sample-and-hold signal SHR. Then, storage capacitance C2 exceeds the saturation level, and detection circuit 52 operates. Then, the charges in photodiode PD and storage capacitance C2 are subjected to FD mixing so that the signal component of the saturation level (saturation signal Qsat) of the LCG signal is sampled and held in capacitance element CS of sample-and-hold circuit 30 in accordance with sample-and-hold signal SHS. This operation is repeatedly performed N times.

Here, sample-and-hold circuit 30 does not necessarily have to repeatedly store saturation signal Qsat after every initialization, and may store saturation signal Qsat only once during exposure and continue to hold stored saturation signal Qsat.

From time 103 to time 104, the reset component of the MCG signal is not sampled and held by sample-and-hold circuit 30. This is because sample-and-hold circuit 30 has stored charge from time 102 to time 103.

From time 104 to time 106, the reset component and signal component of the HCG signal are neither AD-converted nor stored in memory 513. This is because the HCG signal is unnecessary under high illumination conditions.

From time 106 to time 107, the selective readout operation in FIG. 11 is performed, and then processing from time 107 to time 108 is performed irrespective of whether the level of the HCG signal exceeds the saturation level.

From time 107 to time 108, the signal component of the MCG signal is not sampled and held by sample-and-hold circuit 30. This is because the MCG signal is unnecessary under high illumination conditions.

From time 108 to time 110, sampled and held saturation signal Qsat of the LCG signal (specifically, the reset component and signal component of saturation signal Qsat) is AD-converted and stored in memory 513. Saturation signal Qsat of the LCG signal as used herein may be either of saturation signal Qsat obtained when initialization count N is one or saturation signal Qsat obtained when initialization count N is two.

From time 110 to time 112, the charges in photodiode PD and storage capacitance C2 are subjected to FD mixing so that the reset component and signal component of the residual signal of the LCG signal are respectively sampled and held in capacitance elements CR and CS of sample-and-hold circuit 30 in accordance with sample-and-hold signals SHR and SHS.

From time 115 to time 116, data on saturation signal Qsat of the LCG signal stored in memory 513 is transferred to signal processor 70 during the next exposure.

From time 116 to time 118, the sampled and held residual signal of the LCG signal (specifically, the reset component and signal component of the residual signal) is AD-converted and stored in memory 513 that has become empty from time 115 to time 116.

From time 118 to time 119, data on the residual signal of the LCG signal stored in memory 513 is transferred to signal processor 70 during exposure.

Dependence of S/N ratio on Subject Illumination

Next, the dependence of the S/N ratio on subject illumination will be described with reference to FIG. 25.

Figure 25:
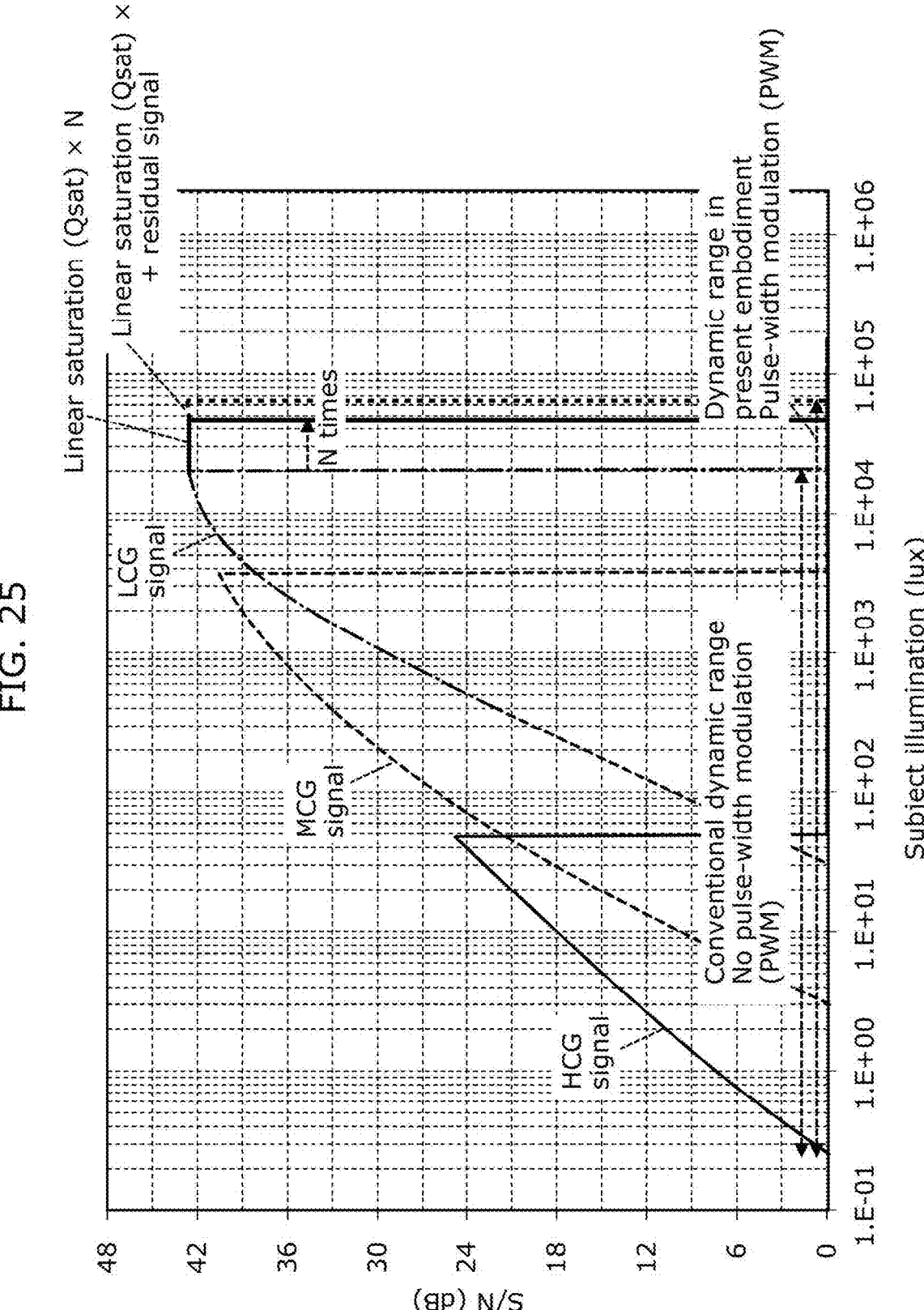
FIG. 25 is a diagram showing S/N ratios of a residual signal and saturation signals of the HCG, MCG, and LCG signals.

FIG. 25 is a diagram showing the S/N ratios of the HCG signal, the MCG signal, saturation signal Qsat (also described as linear saturation (Qsat)) of the LCG signal, and the residual signal of the LCG signal. FIG. 25 shows the S/N ratios of the HCG signal under low illumination, the MCG signal under middle illumination, and the LCG signal under high illumination, which are obtained by adding the S/N ratio of the first signal (linear saturation (Qsat) of the LCG signal×N+residual signal) to the S/N ratios shown in (d) in FIG. 7.

The S/N ratio under low illumination is excellent because the HCG signal is directly AD-converted by AD conversion circuit 51. As shown in FIG. 25, although the maximum subject illumination according to a conventional method without using PWM is expressed as "linear saturation (Qsat)", but the maximum subject illumination according to the method using PWM disclosed in the presence disclosure is expressed as "linear saturation (Qsat)×N+residual signal". It is thus possible to greatly expand the dynamic range.

Here, to be more specific, the S/N ratio expressed as "linear saturation (Qsat)×N+residual signal" remains equivalent to the S/N ratio expressed as linear saturation (Qsat) of the LCG signal. This is because the S/N ratio of linear saturation (Qsat) of the LCG signal is determined by the square root v of shot noise (linear saturation (Qsat)) and remains unchanged even after both of signal S (Signal) and noise N (Noise) are digitally multiplied by initialization count N by signal processor 70.

Here, since the S/N ratio expressed as "linear saturation (Qsat)×N" is equivalent to the S/N ratio of linear saturation (Qsat) as described above, the S/N ratio expressed as "linear saturation (Qsat)×N+the residual signal" is equivalently expressed as "linear saturation (Qsat)+residual signal". Signal S (Signal) is expressed as "S=(Qsat)+residual signal" and noise N (Noise) is expressed as the average root-mean square of each shot noise. Thus, "N=$\sqrt{((\sqrt{Qsat})^2 + (\sqrt{residual\ signal})^2)} = \sqrt{(Qsat + residual\ signal)}$" is satisfied. Thus, the S/N ratio is expressed as "$\sqrt{(Qsat + residual\ signal)}$".

According to the present disclosure, even in the case of using small-capacity storage capacitance C2 instead of high-density storage capacitance C2, it is possible to expand the dynamic range.

Besides, it is clear that ideal characteristics can be achieved because there are no great difference in S/N ratio at the boundaries serving as the transition regions of the HCG signal, the MCG signal, and the LCG signal.

When the PWM method is adopted into photodiode PD disclosed in PTL 1, the maximum S/N ratio is determined by shot noise at the time of saturation of the MCG signal of photodiode PD and becomes a fixed value. This is because the S/N ratio of photodiode PD remains unchanged even if digitally multiplied by N. However, according to the present disclosure, the maximum S/N ratio is determined by shot noise at the saturation of the LCG signals of photodiode PD and storage capacitance C2. Therefore, the present disclosure is capable of improving the S/N ratio as compared with the conventional method.

Note that the saturation signal (Qsat) of the LCG signal may be calculated by sample-and-hold circuit 30 after every initialization, or may be calculated from an average value of saturation signals obtained by multiple executions of initialization. This leads to an improvement in the accuracy of the saturation signal (Qsat) of the LCG signal.

It is preferable that amplifier transistor SF1 may be greater in size than amplifier transistor SF2. Increasing the size of amplifier transistor SF1, which reads out signals, reduces noise. Moreover, reducing the size of amplifier transistor SF2, which reads out detection signals, suppresses a reduction in the area of photodiode PD.

Image Capturing Device Adopting Solid-State Imaging Device

Next, an image capturing device that adopts solid-state imaging device 100 will be described with reference to FIG. 26.

Figure 26:
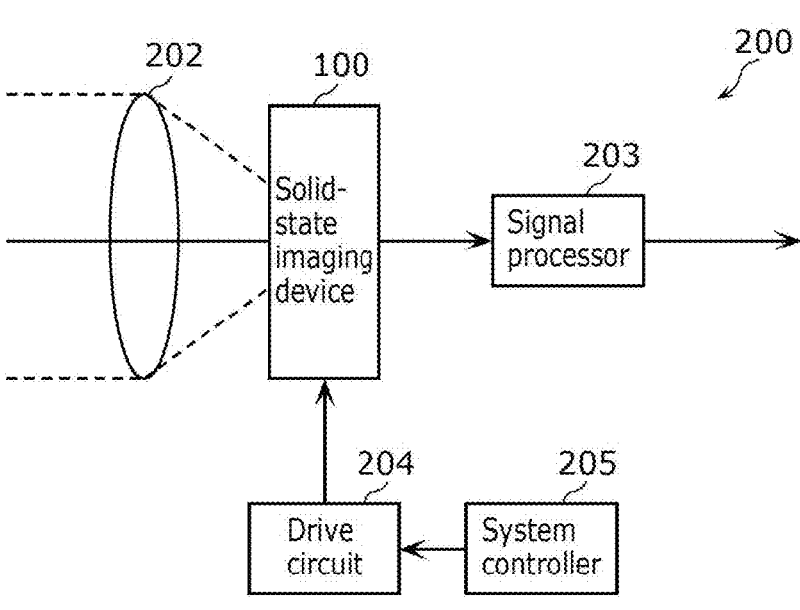
FIG. 26 is a diagram showing an example of an image capturing device that applies the solid-state imaging device according to the embodiment.

FIG. 26 is a diagram showing an example of image capturing device 200 that adopts solid-state imaging device 100 according to the embodiment.

Image capturing device 200 in the drawing is a camera system and includes solid-state imaging device 100, optical imaging system 202 including a lens, signal processor 203, drive circuit 204, and system controller 205. Solid-state imaging device 100 is used in image capturing device 200.

Drive circuit 204 receives input of a control signal that depends on a drive mode from system controller 205 and supplies a drive mode signal to solid-state imaging device 100. Upon receipt of the supply of the drive mode signal, solid-state imaging device 100 generates a drive pulse corresponding to the drive mode signal and supplies the drive pulse to each block in solid-state imaging device 100.

Signal processor 203 receives input of an image signal that is output from solid-state imaging device 100 and performs a variety of signal processing on the image signal.

In this way, image capturing device 200 includes solid-state imaging device 100, optical imaging system 202 that guides incident light received from a subject to solid-state imaging device 100, and signal processor 203 that processes the output signal received from solid-state imaging device 100.

Distance-Measuring Imaging Device Adopting Solid-State Imaging Device

Next, a distance-measuring imaging device that adopts solid-state imaging device 100 will be described with reference to FIG. 27.

Figure 27:
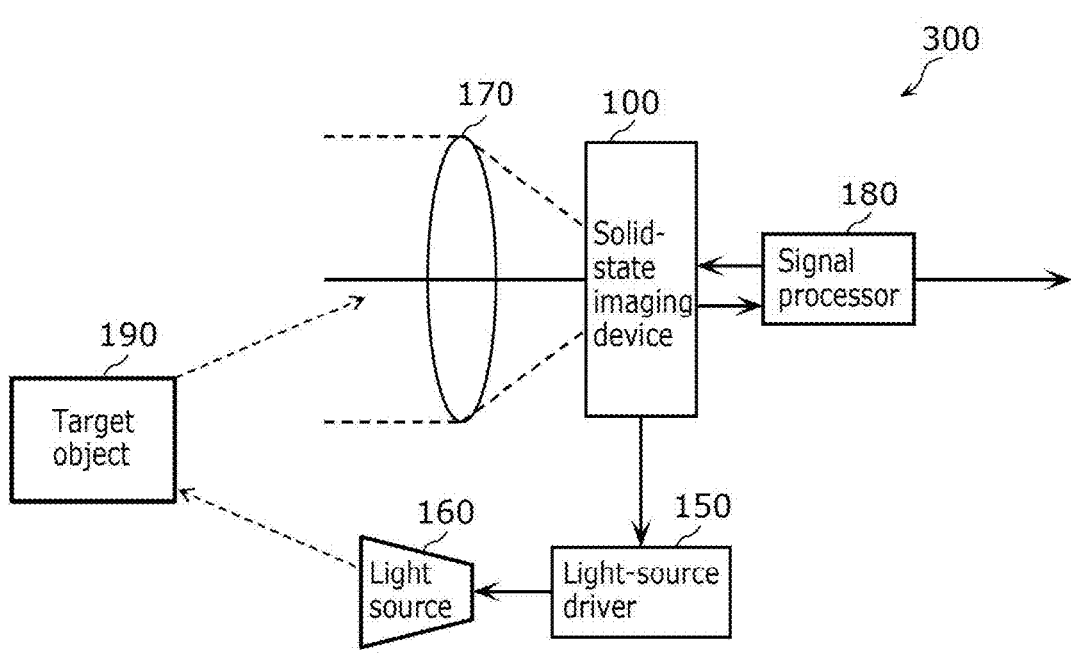
FIG. 27 is a diagram showing an example of a distance-measuring imaging device that applies the solid-state imaging device according to the embodiment.

FIG. 27 is a diagram showing an example of distance-measuring imaging device 300 that adopts solid-state imaging device 100 according to the embodiment. A target for distance measurement is target object 190.

Distance-measuring imaging device 300 includes light-source driver 150, light source 160, optical lens 170, signal processor 180, and solid-state imaging device 100. Solid-state imaging device 100 is used in distance-measuring imaging device 300.

Light-source driver 150 supplies a drive signal to light source 160 in accordance with a signal received from solid-state imaging device 100, the signal serving as an instruction to emit light.

Light source 160 emits pulse light for distance measurement in accordance with the driving signal received from light source driver 150.

Optical lens 170 is a lens for collecting reflected pulse light received from target object 190, the reflected pulse light corresponding to the pulse light from light source 160.

Signal processor 180 obtains the distance to target object 190 by computation based on the signal received from solid-state imaging device 100.

Solid-state imaging device 100 causes light source 160 to irradiate target object 190 with far-red light under background light. Reflected light from target object 190 is incident on pixel array 1 through optical lens 170. The reflected light incident on pixel array 1 forms an image, and the formed optical image is converted into pixel signals. The output of solid-state imaging device 100 is converted into distance data by signal processor 180 and is also converted into a visible distance image or luminance image depending on application.

OTHER EMBODIMENTS

While solid-state imaging device 100 according to one or a plurality of aspects of the present disclosure has been described thus far with reference to the embodiment, the present disclosure is not intended to be limited to the embodiment described above. Those skilled in the art will readily appreciate that many modifications are possible in the exemplary embodiment, and other embodiments may be made by arbitrarily combining some of the constituent elements of different exemplary embodiments without materially departing from the scope of the present disclosure. Accordingly, all such modifications are intended to be included within the scope of the present disclosure.

INDUSTRIAL APPLICABILITY

The present disclosure relates to a solid-state imaging device and to an image capturing device or a distance-measuring imaging device that adopts the solid-state imaging device as an imaging device, and is favorably applicable to, for example, a digital camera or a distance-measuring system.

The invention claimed is:

1. A solid-state imaging device comprising:
a pixel circuit that outputs a plurality of pixel signals;
a detection circuit;
a pixel control circuit that controls the pixel circuit; and
a signal processor,
wherein the pixel circuit includes:
a photodiode;
a first transfer transistor that reads out a signal of the photodiode to a floating diffusion; and
a storage capacitance that stores a charge overflowing from the photodiode,
the detection circuit compares a signal of the storage capacitance with a first reference value and, when the signal of the storage capacitance has reached the first reference value, initializes the photodiode and the storage capacitance via the pixel control circuit and counts an initialization count, and
the signal processor calculates a first signal that indicates intensity of incident light in accordance with the initialization count and a mixed signal of the signal of the storage capacitance and the signal of the photodiode that has been read out to the floating diffusion by the first transfer transistor.

2. The solid-state imaging device according to claim 1, further comprising:

a sample-and-hold circuit; and an analog-to-digital (AD) conversion circuit.

3. The solid-state imaging device according to claim 2, wherein at least one pixel signal among the plurality of pixel signals is not retained in the sample-and-hold circuit and is directly AD-converted by the AD conversion circuit, and at least one other pixel signal among the plurality of pixel signals is retained in the sample-and-hold circuit, and the signal retained is AD-converted by the AD conversion circuit.

4. The solid-state imaging device according to claim 2, wherein when the initialization count is one or more:

the pixel circuit outputs a second signal and initializes the photodiode and the storage capacitance during exposure, the second signal being a mixed signal of the signal of the photodiode and the signal of the storage capacitance that are obtained when the signal of the storage capacitance has reached the first reference value;

the second signal is retained in the sample-and-hold circuit, and the signal retained is AD-converted by the AD conversion circuit; and the pixel circuit outputs a third signal at an end of the exposure, the third signal being a mixed signal of the signal of the photodiode and the signal of the storage capacitance that are remaining in the photodiode and the storage capacitance due to the signal of the storage capacitance not reaching the first reference value, and the third signal is not retained in the sample-and-hold circuit and is directly AD-converted by the AD conversion circuit.

5. The solid-state imaging device according to claim 4, wherein the sample-and-hold circuit includes:

a first sample-and-hold capacitance element for a reset component; and a second sample-and-hold capacitance element for a signal component, and when the initialization count is one or more:

during exposure, a reset component is retained in the first sample-and-hold capacitance element after initialization of the photodiode and the storage capacitance;

when the signal of the storage capacitance has reached the first reference value during exposure, the second signal is retained as a signal component in the second sample-and-hold capacitance element; and the AD conversion circuit performs AD conversion of a pixel signal level by comparing the pixel signal level with a second reference value, the pixel signal level being obtained by deducting the reset component from the signal component.

6. The solid-state imaging device according to claim 2, wherein when the initialization count is zero:

the pixel circuit outputs a fourth signal in a low illumination mode for low illumination and outputs a fifth signal in a mode for high illumination higher than illumination in the low illumination mode;

the fourth signal is not retained in the sample-and-hold circuit and is directly AD-converted by the AD conversion circuit; and

the fifth signal is retained in the sample-and-hold circuit, and the signal retained is AD-converted by the AD conversion circuit.

7. The solid-state imaging device according to claim 6, wherein the pixel circuit further includes:

a second transfer transistor that transfers a charge stored in the storage capacitance to the floating diffusion;

a first amplifier transistor that outputs the signal of the photodiode and the signal of the storage capacitance;

a first selector transistor connected to the first amplifier transistor;

a second amplifier transistor connected to the storage capacitance; and a second selector transistor connected to the second amplifier transistor, the detection circuit is connected to the storage capacitance via the second selector transistor and the second amplifier transistor, in the low illumination mode, the pixel circuit outputs the signal of the photodiode as the fourth signal from the first amplifier transistor via the first transfer transistor, the mode for high illumination includes a high illumination mode in which the pixel circuit outputs the signal of the storage capacitance as a sixth signal from the first amplifier transistor via the second transfer transistor, and the sixth signal belongs to the fifth signal.

8. The solid-state imaging device according to claim 7, wherein the pixel circuit further includes a reset transistor, and the detection circuit discharges charges stored in the photodiode and the storage capacitance and initializes the photodiode and the storage capacitance by controlling the reset transistor, the first transfer transistor, and the second transfer transistor via the pixel control circuit in accordance with a result of the comparison between the signal of the storage capacitance and the first reference value.

9. The solid-state imaging device according to claim 7, wherein the pixel circuit further includes a gain switching transistor that switches a gain of the signal of the photodiode, the mode for high illumination includes a middle illumination mode in which the pixel circuit outputs the signal of the photodiode as a seventh signal from the first amplifier transistor by controlling the gain switching transistor, and the seventh signal belongs to the fifth signal.

10. The solid-state imaging device according to claim 6, wherein the signal processor includes a WDR processor, when the initialization count is one or more, the WDR processor generates an output signal from at least the first signal, and when the initialization count is zero, the WDR processor generates an output signal from at least one of the fourth signal or the fifth signal.

11. The solid-state imaging device according to claim 2, wherein the AD conversion circuit includes a comparator, and when the initialization count is zero:

the pixel circuit outputs three or more pixel signals;

the comparator compares one pixel signal that has been AD-converted among the three or more pixel signals with a second reference value and, when the one pixel signal has reached the second reference value, generates a selection signal that instructs to select at least two pixel signals from among the three or more pixel signals; and the pixel control circuit selects the at least two pixel signals from among the three or more pixel signals in accordance with the selection signal.

12. The solid-state imaging device according to claim 2, wherein the AD conversion circuit and the detection circuit are provided for every single pixel circuit serving as the pixel circuit, and the pixel control circuit controls the every single pixel circuit on a one-by-one basis.

13. The solid-state imaging device according to claim 2, wherein the AD conversion circuit and the detection circuit are provided for each set of a plurality of pixel circuits each serving as the pixel circuit, the pixel control circuit controls every single pixel circuit serving as the pixel circuit on a one-by-one basis, and the detection circuit compares the signal of the storage capacitance in a corresponding pixel circuit serving as the pixel circuit with the first reference value while synchronizing the corresponding pixel circuit and the pixel control circuit with each other.

14. The solid-state imaging device according to claim 13, wherein when the initialization count is zero:

the pixel circuit outputs a fourth signal in a low illumination mode for low illumination and outputs a fifth signal in a mode for high illumination higher than illumination in the low illumination mode;

the fourth signal is not retained in the sample-and-hold circuit and is directly AD-converted by the AD conversion circuit; and the fifth signal is retained in the sample-and-hold circuit, and the signal retained is AD-converted by the AD conversion circuit, the pixel circuit further includes:

a second transfer transistor that transfers a charge stored in the storage capacitance to the floating diffusion;

a first amplifier transistor that outputs the signal of the photodiode and the signal of the storage capacitance;

a first selector transistor connected to the first amplifier transistor;

a second amplifier transistor connected to the storage capacitance; and a second selector transistor connected to the second amplifier transistor, the detection circuit is connected to the storage capacitance via the second selector transistor and the second amplifier transistor, in the low illumination mode, the pixel circuit outputs the signal of the photodiode as the fourth signal from the first amplifier transistor via the first transfer transistor, the mode for high illumination includes a high illumination mode in which the pixel circuit outputs the signal of the storage capacitance as a sixth signal from the first amplifier transistor via the second transfer transistor, the sixth signal belongs to the fifth signal, and the pixel control circuit synchronizes control of the first selector transistor, the second selector transistor, and the sample-and-hold circuit in the corresponding pixel circuit.

15. The solid-state imaging device according to claim 13, wherein a plurality of pixel circuits, each serving as the pixel circuit, correspond to pixels in a color filter array, and the pixel control circuit performs the same pixel control on the plurality of pixel circuits in accordance with a maximum signal level of the pixels in the color filter array.

16. The solid-state imaging device according to claim 2 further comprising:

a first semiconductor substrate that includes the pixel circuit; and a second semiconductor substrate that includes the detection circuit and the AD conversion circuit, wherein the first semiconductor substrate and the second semiconductor substrate are layered one above the other.

17. A solid-state imaging device comprising:

a pixel circuit; and a detection circuit, wherein the pixel circuit includes:

a photodiode;

a floating diffusion to which a signal of the photodiode is read out;

a storage capacitance that stores a charge overflowing from the photodiode; and reset means for initializing the photodiode, the floating diffusion, and the storage capacitance, the detection circuit includes:

a comparator that compares a signal of the storage capacitance with a first reference value; and an initialization circuit that controls the reset means in accordance with a comparison result obtained from the comparator, the pixel circuit is formed on a first semiconductor substrate that includes one or a plurality of semiconductor layers, the detection circuit is formed on a second semiconductor substrate that includes one or a plurality of semiconductor layers, and the first semiconductor substrate and the second semiconductor substrate are layered one above the other.

18. The solid-state imaging device according to claim 17, wherein the pixel circuit further includes:

a first transfer transistor that reads out the signal of the photodiode to the floating diffusion; and a second transfer transistor that transfers the signal of the storage capacitance to the floating diffusion.

19. The solid-state imaging device according to claim 17, further comprising:

an AD conversion function of converting a signal of the floating diffusion into a digital value, the AD conversion function being provided on the second semiconductor substrate, wherein the comparator and the AD conversion function have input terminals that are each connected to a different output terminal of the pixel circuit.

20. The solid-state imaging device according to claim 17, further comprising:

an AD conversion function of converting a signal of the floating diffusion into a digital value, the AD conversion function being provided on the second semiconductor substrate; and a selection circuit that receives input of the signal of the storage capacitance and the signal of the floating diffusion and selects an output, the selection circuit being formed on the first semiconductor substrate or the second semiconductor substrate, wherein the output of the selection circuit is input to the AD conversion function, and the detection circuit and the AD conversion function share the comparator.

\* \* \* \* \*